(12) United States Patent
Runge et al.

(10) Patent No.: US 12,280,917 B2
(45) Date of Patent: Apr. 22, 2025

(54) COEXTRUDED POLYMERIC ARTICLE AND METHOD OF MAKING THE SAME

(71) Applicant: 3M INNOVATIVE PROPERTIES COMPANY, St. Paul, MN (US)

(72) Inventors: Michael B. Runge, Stillwater, MN (US); Vasav Sahni, St. Paul, MN (US); Ronald W. Ausen, St. Paul, MN (US); Scott M. Tapio, Falcon Heights, MN (US); William J. Kopecky, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/781,144

(22) PCT Filed: Dec. 4, 2020

(86) PCT No.: PCT/IB2020/061545
§ 371 (c)(1),
(2) Date: May 31, 2022

(87) PCT Pub. No.: WO2021/116864
PCT Pub. Date: Jun. 17, 2021

(65) Prior Publication Data
US 2022/0411135 A1 Dec. 29, 2022

Related U.S. Application Data

(60) Provisional application No. 62/987,439, filed on Mar. 10, 2020, provisional application No. 62/945,564, filed on Dec. 9, 2019.

(51) Int. Cl.
*B65D 33/25* (2006.01)
*B29C 48/12* (2019.01)
(Continued)

(52) U.S. Cl.
CPC .......... *B65D 33/2541* (2013.01); *B29C 48/12* (2019.02); *B29C 48/21* (2019.02);
(Continued)

(58) Field of Classification Search
CPC ..... B65D 33/2541; B29C 48/21; B29C 48/12; B29K 2023/06; B29K 2023/22;
(Continued)

(56) References Cited

U.S. PATENT DOCUMENTS

RE24,906 E    12/1960   Ulrich
3,192,589 A    7/1965   Pearson
(Continued)

FOREIGN PATENT DOCUMENTS

CA        2257390       6/2000
CN       204323921      5/2015
(Continued)

OTHER PUBLICATIONS

International Search Report for PCT Application No. PCT/IB2020/061545 mailed on Feb. 9, 2021, 3 pages.

Primary Examiner — Jason W San
Assistant Examiner — Matthew J Sullivan
(74) Attorney, Agent, or Firm — Kathleen B. Gross

(57) ABSTRACT

A system including a polymeric sheet. The polymeric sheet comprises a base sheet having a first surface and a second surface opposite the first surface and a multiplicity of spaced rails projecting from the first surface of the base sheet. The rails comprise a stem portion attached to and substantially upright from the first surface of the base sheet and a top portion on the distal end of the stem opposite the base sheet. The top portion comprises a first surface opposite the base sheet and a second surface facing the first surface of the base sheet. Additionally, the rails have a length greater than the width of the stems. The first surface of the base sheet, the (Continued)

second surface of the top portion and the surface of the stem defines a cavity with walls, and an adhesive coated on at least a portion of the cavity wall.

20 Claims, 7 Drawing Sheets

(51) Int. Cl.
*B29C 48/21* (2019.01)
*B29K 23/00* (2006.01)
*B29L 5/00* (2006.01)
*B29L 31/00* (2006.01)

(52) U.S. Cl.
CPC ...... *B29K 2023/06* (2013.01); *B29K 2023/22* (2013.01); *B29L 2005/00* (2013.01); *B29L 2031/7288* (2013.01)

(58) Field of Classification Search
CPC ......... B29L 2005/00; B29L 2031/7288; A44B 18/0053; A44B 18/0065; Y10T 24/27; Y10T 24/2792
See application file for complete search history.

(56) References Cited

U.S. PATENT DOCUMENTS

| | | | |
|---|---|---|---|
| 3,408,705 A | 11/1968 | Kayser | |
| 3,633,642 A | 1/1972 | Siegel | |
| 3,808,648 A | 5/1974 | Billarant | |
| 3,906,578 A | 9/1975 | Huber | |
| 4,067,337 A | 1/1978 | Ness | |
| 4,083,914 A | 4/1978 | Schippers | |
| 4,249,982 A | 2/1981 | Ausnit | |
| 4,322,875 A | 4/1982 | Brown | |
| 4,372,793 A | 2/1983 | Herz | |
| 4,562,027 A | 12/1985 | Behr | |
| 4,655,862 A | 4/1987 | Christoff | |
| 4,707,893 A | 11/1987 | Hashizume | |
| 4,775,310 A | 10/1988 | Fischer | |
| 4,824,261 A | 4/1989 | Provost | |
| 4,835,835 A | 6/1989 | Gould | |
| 4,854,017 A | 8/1989 | Kamp | |
| 4,875,259 A | 10/1989 | Appeldorn | |
| 4,894,060 A | 1/1990 | Nestegard | |
| 4,931,003 A | 6/1990 | VanErden | |
| 4,955,981 A | 9/1990 | Provost | |
| 5,019,065 A | 5/1991 | Scripps | |
| 5,040,275 A | 8/1991 | Eckhardt | |
| 5,067,210 A | 11/1991 | Kayaki | |
| 5,077,870 A | 1/1992 | Melbye | |
| 5,088,164 A | 2/1992 | Wilson | |
| 5,097,570 A * | 3/1992 | Gershenson | A44B 18/0053 24/442 |
| 5,103,546 A | 4/1992 | Rossini | |
| 5,113,555 A | 5/1992 | Wilson | |
| 5,119,531 A | 6/1992 | Berger | |
| 5,212,853 A | 5/1993 | Kaneko | |
| 5,221,276 A * | 6/1993 | Battrell | A44B 18/008 24/304 |
| 5,248,201 A | 9/1993 | Kettner | |
| 5,396,687 A | 3/1995 | Osterman | |
| 5,398,387 A | 3/1995 | Torigoe | |
| 5,403,094 A | 4/1995 | Tomic | |
| 5,549,591 A | 8/1996 | Landvogt | |
| 5,586,372 A | 12/1996 | Eguchi | |
| 5,607,635 A | 3/1997 | Melbye | |
| 5,611,122 A * | 3/1997 | Torigoe | A44B 18/0065 24/442 |
| 5,624,429 A | 4/1997 | Long | |
| 5,625,929 A | 5/1997 | Hattori | |
| 5,657,516 A * | 8/1997 | Berg | A44B 18/0092 24/584.1 |
| 5,679,302 A | 10/1997 | Miller | |
| 5,782,733 A | 7/1998 | Yeager | |
| 5,785,784 A | 7/1998 | Chesley | |
| 5,794,315 A | 8/1998 | Crabtree | |
| 5,797,170 A | 8/1998 | Akeno | |
| 5,819,391 A * | 10/1998 | Matsushima | A44B 18/0003 24/442 |
| 5,868,987 A | 2/1999 | Kampfer | |
| 5,884,374 A | 3/1999 | Clune | |
| 5,933,927 A | 8/1999 | Miller | |
| 5,947,603 A * | 9/1999 | Tilman | B65D 33/2541 160/124 |
| 5,951,453 A | 9/1999 | Yeager | |
| 6,000,106 A | 12/1999 | Kampfer | |
| 6,004,032 A | 12/1999 | Kapperman | |
| 6,039,556 A | 3/2000 | Jens | |
| 6,076,238 A | 6/2000 | Arsenault | |
| 6,106,922 A | 8/2000 | Cejka | |
| 6,112,377 A | 9/2000 | Wilson | |
| 6,115,892 A | 9/2000 | Malin | |
| 6,132,660 A | 10/2000 | Kampfer | |
| 6,159,596 A | 12/2000 | Calhoun | |
| 6,180,205 B1 | 1/2001 | Tachauer | |
| 6,190,594 B1 | 2/2001 | Gorman | |
| 6,206,679 B1 | 3/2001 | Provost | |
| 6,210,389 B1 | 4/2001 | Long | |
| 6,276,032 B1 | 8/2001 | Nortman | |
| 6,287,665 B1 | 9/2001 | Hammer | |
| 6,318,894 B1 | 11/2001 | Derenthal | |
| 6,367,128 B1 | 4/2002 | Galkiewicz | |
| 6,372,323 B1 | 4/2002 | Kobe | |
| 6,393,673 B1 | 5/2002 | Kourtidis et al. | |
| 6,402,730 B1 | 6/2002 | Malowaniec | |
| 6,419,667 B1 | 7/2002 | Avalon | |
| 6,428,525 B1 | 8/2002 | Malowaniec | |
| 6,489,003 B1 | 12/2002 | Levitt | |
| 6,524,294 B1 | 2/2003 | Hilston | |
| 6,531,206 B2 | 3/2003 | Johnston | |
| 6,546,604 B2 * | 4/2003 | Galkiewicz | A44B 18/0092 24/584.1 |
| 6,581,253 B2 * | 6/2003 | ErkenBrack | B65D 33/2508 24/399 |
| 6,592,800 B1 | 7/2003 | Levitt | |
| 6,627,133 B1 | 9/2003 | Tuma | |
| 6,743,213 B1 | 6/2004 | Minato | |
| 6,779,921 B2 | 8/2004 | Yeager | |
| 6,851,161 B2 | 2/2005 | Kingsford | |
| 6,919,504 B2 | 7/2005 | McCutcheon | |
| 6,930,277 B2 | 8/2005 | Gallant | |
| 7,052,639 B2 | 5/2006 | Gorman | |
| 7,140,774 B2 | 11/2006 | Galkiewicz | |
| 7,172,008 B2 | 2/2007 | Vanbenschoten | |
| 7,185,401 B2 | 3/2007 | Ausen | |
| 7,195,729 B2 | 3/2007 | Jackson | |
| 7,198,743 B2 | 4/2007 | Tuma | |
| 7,214,334 B2 | 5/2007 | Jens | |
| 7,225,510 B2 | 6/2007 | Gallant | |
| 7,322,920 B2 | 1/2008 | Johnson | |
| 7,373,700 B2 | 5/2008 | Martin | |
| 7,445,741 B2 * | 11/2008 | Poulakis | A44B 18/0049 264/211.13 |
| 7,467,873 B2 | 12/2008 | Clarke | |
| 7,637,297 B2 | 12/2009 | Plourde | |
| 7,641,469 B2 | 1/2010 | Clune | |
| 7,797,081 B2 | 9/2010 | DeMarco | |
| 7,841,052 B2 | 11/2010 | Ducauchuis | |
| 7,886,412 B2 | 2/2011 | Dais | |
| 7,897,078 B2 | 3/2011 | Petersen | |
| 7,946,766 B2 * | 5/2011 | Dais | B65D 77/225 24/585.12 |
| 8,225,467 B2 | 7/2012 | Gallant | |
| 8,375,529 B1 * | 2/2013 | Duffy | A44B 18/0053 24/452 |
| 8,398,306 B2 | 3/2013 | Kinigakis | |
| 8,635,749 B2 | 1/2014 | Mayers et al. | |
| 8,641,278 B2 | 2/2014 | Ducauchuis | |
| 8,745,827 B2 | 6/2014 | Rocha | |
| 8,839,495 B2 * | 9/2014 | Tuma | A44B 18/0065 24/442 |

(56) References Cited

U.S. PATENT DOCUMENTS

| | | |
|---|---|---|
| 8,845,943 B2 | 9/2014 | Hertlein |
| 8,858,077 B2 | 10/2014 | Shepard |
| 8,881,369 B2 * | 11/2014 | Kirby .............. A44B 18/0065 |
| | | 428/297.4 |
| 8,956,496 B2 | 2/2015 | Biegler |
| 9,090,005 B2 | 7/2015 | Libby |
| 9,096,960 B2 | 8/2015 | Biegler |
| 9,126,224 B2 | 9/2015 | Biegler |
| 9,181,014 B2 * | 11/2015 | LaFauci .............. C08L 23/0815 |
| 9,198,483 B2 | 12/2015 | Adams |
| 9,210,970 B2 * | 12/2015 | Collins .............. A44B 18/0019 |
| 9,233,500 B2 | 1/2016 | Gorman |
| 9,315,299 B2 | 4/2016 | Yeager |
| 9,498,026 B2 | 11/2016 | Rojas et al. |
| 9,981,780 B2 * | 5/2018 | Delasalle ............. B65D 33/255 |
| 10,301,074 B2 | 5/2019 | Yeager |
| 10,334,723 B2 | 6/2019 | Wald |
| 10,513,372 B2 * | 12/2019 | Wang ................. B65D 33/2508 |
| 10,590,973 B2 | 3/2020 | Cosgrove |
| 11,116,090 B2 | 9/2021 | Cosgrove |
| 11,654,648 B2 * | 5/2023 | Denis ................... B29C 66/244 |
| | | 156/244.11 |
| 2001/0013277 A1 | 8/2001 | Galkiewicz et al. |
| 2001/0018785 A1 * | 9/2001 | Galkievicz ......... B65D 63/1018 |
| | | 24/605 |
| 2001/0022409 A1 | 9/2001 | Parellada |
| 2002/0069495 A1 | 6/2002 | Murasaki |
| 2002/0138064 A1 | 9/2002 | Datta |
| 2003/0015819 A1 | 1/2003 | Levitt |
| 2003/0019780 A1 | 1/2003 | Parodi |
| 2003/0051320 A1 * | 3/2003 | Fagan ................. A44B 18/0084 |
| | | 24/584.1 |
| 2003/0126724 A1 * | 7/2003 | Kono ................. A44B 18/0092 |
| | | 24/451 |
| 2003/0203155 A1 | 10/2003 | Kobe |
| 2003/0235352 A1 | 12/2003 | Plourde |
| 2004/0020133 A1 | 2/2004 | Paxton |
| 2004/0117955 A1 * | 6/2004 | Barvosa-Carter ....... B64C 33/02 |
| | | 24/442 |
| 2006/0168776 A1 | 8/2006 | Dais |
| 2007/0101682 A1 | 5/2007 | Tilman |
| 2007/0154118 A1 * | 7/2007 | Tilman .............. B65D 33/2508 |
| | | 383/105 |
| 2008/0035173 A1 | 2/2008 | Tuman |
| 2008/0131035 A1 | 6/2008 | Rogers |
| 2008/0189913 A1 * | 8/2008 | Bergman ........... B65D 33/2508 |
| | | 24/30.5 L |
| 2008/0226203 A1 * | 9/2008 | Dais ................... B65D 33/2541 |
| | | 383/63 |
| 2008/0249496 A1 | 10/2008 | Peterson |
| 2008/0256901 A1 * | 10/2008 | Custer ................ B65D 33/2533 |
| | | 383/100 |
| 2010/0095489 A1 | 4/2010 | Tuma |
| 2010/0183251 A1 * | 7/2010 | Neltner .............. B65D 33/2508 |
| | | 383/103 |
| 2012/0006822 A1 | 1/2012 | Yeager |
| 2012/0046151 A1 | 2/2012 | Yeager |
| 2012/0128835 A1 | 5/2012 | Lyzenga |
| 2012/0269469 A1 * | 10/2012 | Long ..................... B65D 33/22 |
| | | 493/189 |
| 2012/0314977 A1 | 12/2012 | Matsuo |
| 2013/0071047 A1 | 3/2013 | VanLoocke |
| 2013/0149490 A1 | 6/2013 | Cina |
| 2014/0153846 A1 * | 6/2014 | Dais .................... B65D 33/007 |
| | | 383/61.2 |
| 2014/0250641 A1 | 9/2014 | Zerfas et al. |
| 2014/0270599 A1 | 9/2014 | Farhat |
| 2014/0283342 A1 | 9/2014 | Adams |
| 2016/0067937 A1 | 3/2016 | Yeager |
| 2016/0152357 A1 | 6/2016 | Bierschenk |
| 2016/0347039 A1 | 12/2016 | Sura |
| 2017/0233125 A1 | 8/2017 | Brenkus |
| 2017/0233143 A1 | 8/2017 | Huebner |
| 2017/0295890 A1 | 10/2017 | Imai |
| 2018/0118413 A1 * | 5/2018 | Linot ................. B65D 33/2508 |
| 2018/0228253 A1 | 8/2018 | Emslander |
| 2018/0360170 A1 | 12/2018 | Fukuhara |
| 2020/0323313 A1 | 10/2020 | Abe |
| 2020/0352287 A1 | 11/2020 | Gorman |
| 2020/0384677 A1 | 12/2020 | Ausen |
| 2020/0385175 A1 | 12/2020 | Gorman |
| 2020/0406524 A1 | 12/2020 | Ausen |
| 2021/0000226 A1 | 1/2021 | Gorman |
| 2021/0000227 A1 * | 1/2021 | Gorman ............. B65D 33/2558 |
| 2021/0086469 A1 | 1/2021 | Cosgrove |
| 2021/0078233 A1 | 3/2021 | Ausen |
| 2021/0146648 A1 | 5/2021 | Cosgrove |
| 2021/0268710 A1 | 9/2021 | Ausen |
| 2021/0284396 A1 * | 9/2021 | Plourde .................. C08L 1/286 |
| 2022/0112002 A1 * | 4/2022 | Oike ................. B65D 33/2533 |
| 2022/0220989 A1 | 7/2022 | Cosgrove |
| 2022/0306346 A1 * | 9/2022 | Shin .................... B65D 33/065 |
| 2023/0031043 A1 * | 2/2023 | Dhariwal ........... B65D 33/2508 |
| 2024/0043178 A1 | 2/2024 | Gorman |

FOREIGN PATENT DOCUMENTS

| | | |
|---|---|---|
| EP | 0894448 B1 | 5/2001 |
| WO | WO 2000-18268 | 4/2000 |
| WO | 2004092025 A2 | 10/2004 |
| WO | 2012064688 A2 | 5/2012 |
| WO | 2016176295 A1 | 11/2016 |
| WO | 2020003066 A1 | 1/2020 |
| WO | WO 2020-240449 | 12/2020 |
| WO | WO 2020-240450 | 12/2020 |

* cited by examiner

COEXTRUDED POLYMERIC ARTICLE AND METHOD OF MAKING THE SAME

CROSS REFERENCE TO RELATED APPLICATIONS

This application is a national stage filing under 35 U.S.C. 371 of PCT/IB2020/061545, filed Dec. 4, 2020, which claims the benefit of U.S. Provisional Patent Application No. 62/945,564, filed Dec. 9, 2019 and U.S. Provisional Patent Application No. 62/987,439, filed Mar. 10, 2020, the disclosures of which are incorporated by reference in their entireties herein.

BACKGROUND

Polymeric articles (including layers) having projections are known in the art. There is a desire for additional polymeric articles with projections that offer different configurations and/or properties (e.g., adhesive properties) over conventional articles. Prior disclosures, for example U.S. Pat. No. 6,393,673, disclose a multiplicity of flexible hook elements emanating from a backing layer and comprising stems terminating in hook heads. At least some hook heads and/or at least part of the interstitial spaces between the stems of are coated with a hot-melt pressure-sensitive adhesive.

Additional polymeric articles creating re-closable fasteners could have applications in numerous industrial or consumer applications, for example resealable packaging, specifically food packaging.

SUMMARY

This new re-closable fastener system provides substantial benefits. For example, a re-closable system can be a self-mating article that is easy to close, provides positive tactile feedback to a use, is flexible, low profile, provides an air seal, and a peel force to open and a differential peel force across the opening. Additionally, the system provides a resistance to contamination from particles, allowing adhesive functionality to be maintained.

Using an integrated adhesive/mechanical solution provides multiple advantages over current commercial closure systems. The adhesive provides an airtight re-closable seal. The controlled placement of the adhesive within the fastener provides an opportunity to decouple closing and opening forces. The profile extrusion process allows for the entire structure and all material layers to be co-extruded in a single process.

The system includes a polymeric sheet. The polymeric sheet comprises a base sheet having a first surface and a second surface opposite the first surface and a multiplicity of spaced rails projecting from the first surface of the base sheet. The rails comprise a stem portion attached to and substantially upright from the first surface of the base sheet and a top portion on the distal end of the stem opposite the base sheet. The top portion comprises a first surface opposite the base sheet and a second surface facing the first surface of the base sheet. Additionally, the rails have a length greater than the width of the stems. The first surface of the base sheet, the second surface of the top portion and the surface of the stem defines a cavity with walls, and an adhesive coated to at least a portion of the cavity wall.

In other embodiments, the gap between adjacent top portion caps, G, is greater than the cap width, CW. As such, the caps on the rails mainly engage under sheer loading while adhesive in the cavities between the rails engages with the top of the caps to primarily hold the closure shut and provide an airtight seal. A periodic secondary cap member can be added to the caps and/or un-capped rails. The periodic secondary cap member has a width, w, and w is greater than the gap, G. As such, the periodic secondary cap member will click and lock under the caps when the closure is shut.

Hence in one embodiment, the invention resides in a polymeric sheet article comprising a first strip having a plurality of rails projecting from a first surface of a base sheet; at least two adjacent rails of the plurality of rails having a top portion forming a cap that overhangs at least one side of the rail; the caps each having a cap width, CW; a gap located between the caps on the adjacent rails, and wherein a gap width, G, is wider than the cap width, CW; a cavity located between the two adjacent rails with an adhesive located in the cavity; and a secondary periodic cap member located on at least one the plurality of rails.

DETAILED DESCRIPTION

Figure 1:
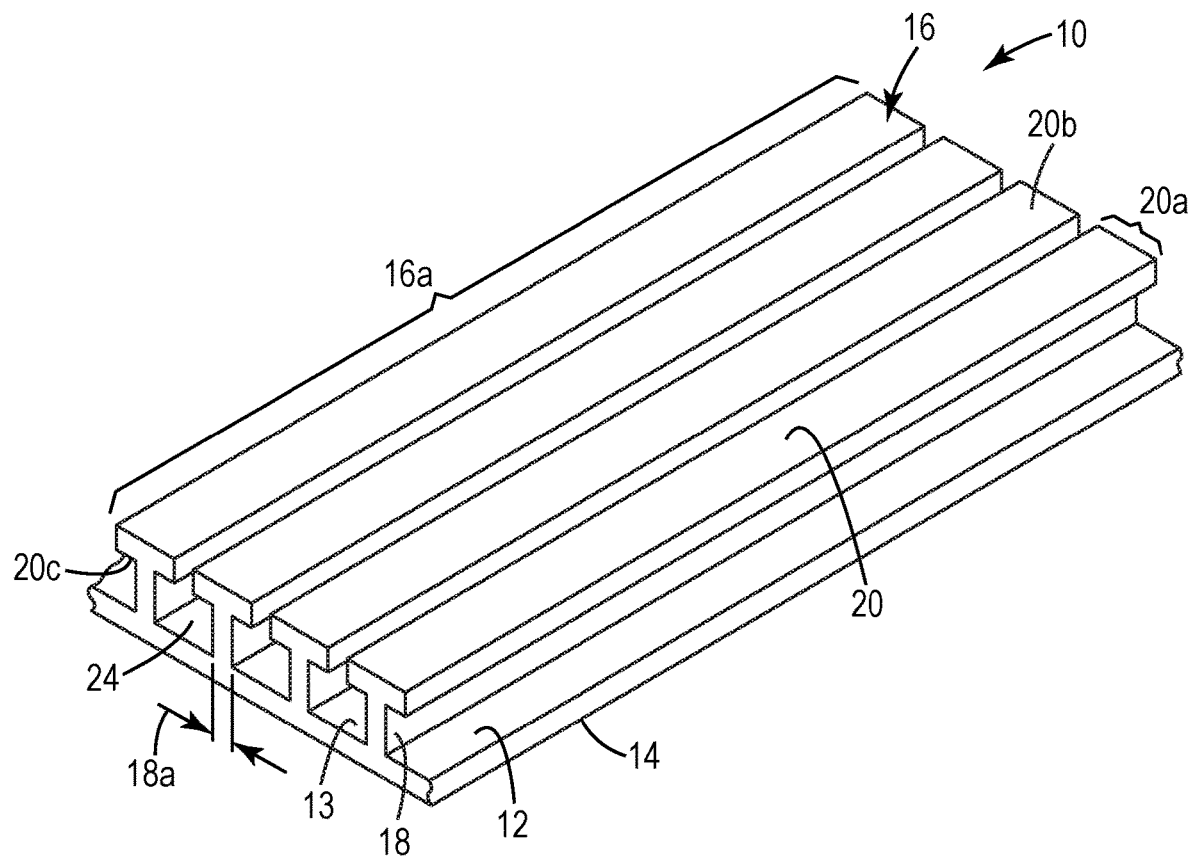
FIG. 1 is a plane view of an exemplary polymeric sheet described herein.

FIG. 1 shows a plane view of the polymeric sheet of the present application. In some embodiments, the polymeric sheet 10 of the present application comprises a base sheet 12 having a first surface 13 and a second surface 14 opposite the first surface. The base sheet may be made of at least one of a thermoplastic resin (e.g., at least one of, including copolymers and blends thereof, a polyolefin (e.g., polypropylene and polyethylene), polyvinyl chloride, a polystyrene, nylon, a polyester (e.g., polyethylene terephthalate) or an elastomer (e.g., an ABA block copolymer, a polyurethane, a polyolefin elastomer, a polyurethane elastomer, a metallocene polyolefin elastomer, a polyamide elastomer, an ethylene vinyl acetate elastomer, and a polyester elastomer)). Preferably, the base sheet is compatible with the material to which the fastener is to be bonded to. In some embodiments, the base sheet may be heat sealable to the end use material. In some embodiments, the base sheet was a low-density polyethylene for best sealing to a low-density polyethylene bag material. In some embodiments, the base sheet is flexible.

The polymeric sheet 10 additionally has a multiplicity of spaced rails 16 projecting from the first surface 13 of the base sheet. The rails 16 comprise a stem portion 18 attached to and substantially upright, for example perpendicular, from the first surface 13 of the base sheet and a top portion 20 on the distal end of the stem opposite the base sheet. Preferably, the rail portion is of high modulus material to provide mechanical strength for interlock. In some embodiments, the rails are a high-density polyethylene. The rails 16 have a length 16a greater than the width 18a (measured perpendicular to the length) of the stem portion 18. In some embodiments, the rails 16 are between 0.1 and 100 centimeters long. In some embodiments, the rails 16 are continuous along the length of the base sheet 12. In some embodiments, the stem portion width 18a is between 0.1 and 1 millimeter wide, for example, between 0.2 and 0.3 millimeter. The length of the stem 18 is equal to the rail length 16a.

The top portion 20 has a length equal to the rail length, and a width 20a greater than the width of the stem 18a. The top portion 20 comprises a first surface 20b opposite the base sheet and a second surface 20c facing the first surface of the base sheet. The first surface 20b and the second surface 20c of the top portion may be parallel to the first surface of the base sheet or it may be non-parallel, for example rounded. In some embodiments the width 20a of the top portion is between 0.15 and 1.5 millimeter, for example, between 0.3 and 0.5 millimeter. The width is measured at the widest portion of the top portion 20. The top portion may have a cross sectional view with any shape that has a top width 20a greater than the stem width 18a. For example, the top portion 20 may have a cross section that is a rectangle, an oval, a circle or a semi-circle.

Figure 2A:
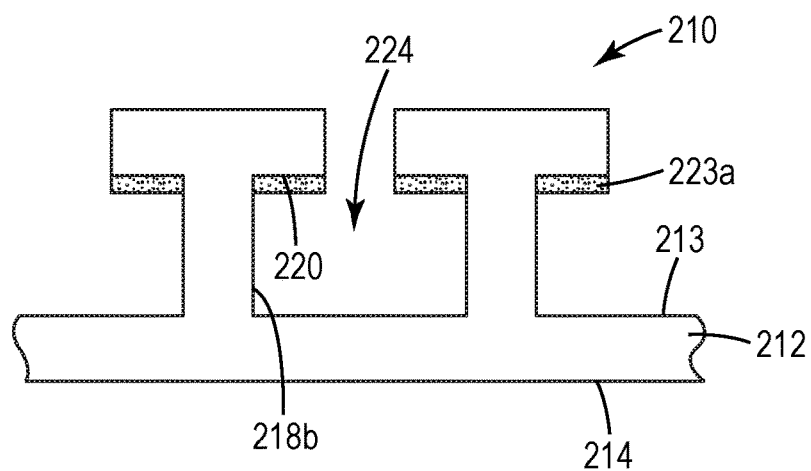
FIG. 2a is a schematic cross-sectional view of an exemplary polymeric sheet described herein.
Figure 2B:
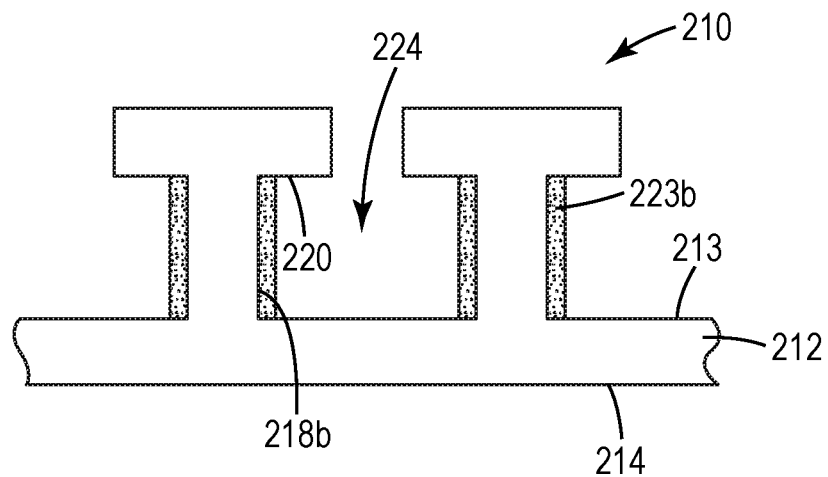
FIG. 2b is a schematic cross-sectional view of another exemplary polymeric sheet described herein.
Figure 2C:
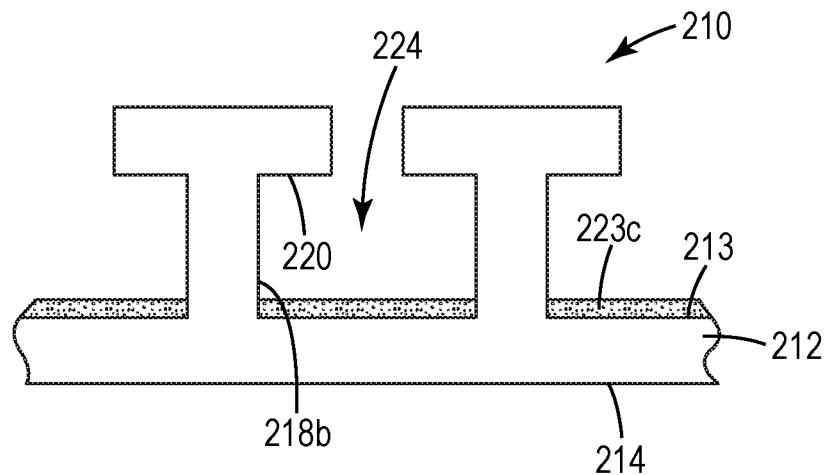
FIG. 2c is a schematic cross-sectional view of another exemplary polymeric sheet described herein.

The first surface 13 of the base sheet 12, the second surface 20c of the top portion 20 and the surface of the stem 18b between them defines a cavity with walls 24. The cavity 24 is not fully enclosed, but has four sides, with one side being interrupted. An adhesive is on at least a portion of the cavity wall. The adhesive can be on any portion of the cavity wall. FIGS. 2a through 2c show embodiments of the adhesive location. FIG. 2a shows adhesive 23 on the second surface of the top portion 220c. FIG. 2b shows adhesive 23 on the surface of the stem 218b. FIG. 2c shows adhesive 23 on the first surface of the base sheet 213. Generally, there is adhesive on the first surface of the base sheet 213. In other embodiments, the adhesive is on any combination of the surfaces that define the cavity walls 25.

The spaces between adjacent top portions are between 0.1 and 5 mm apart. In specific embodiments, the first surface 20b of the top portion has no adhesive. This allows for a user to not engage with the adhesive, as well as providing a mechanical barrier to adhesive contamination.

In some embodiments, the adhesive is at least one of an acrylate copolymer pressure sensitive adhesive, a rubber-based adhesive (e.g., those based on at least one of natural rubber, polyisobutylene, polybutadiene, butyl rubber, or styrene block copolymer rubber), a silicone polyurea-based adhesive, a silicone polyoxamide-based adhesive, a polyurethane-based adhesive, or a poly(vinyl ethyl ether)-based adhesive. In some embodiments, the adhesive is preferably polyisobutylene based, to provide food safe contact. In some embodiments the adhesive provides high peel and shear performance for strong closure.

In some embodiments, the base sheet comprises a first material, the rails comprise a second material (or can, for example, have differing materials in the stem and the top portions), and the adhesive comprises a third material. Selection of the materials for the polymeric sheet and components of the sheet may be based on the properties of the material. For example, it may be beneficial to have a flexible base sheet. Another example is it may be a benefit to have a top portion that is a harder material to ensure engagement when connected to another sheet. The first and second may be the same material and different from the third material. In other embodiments, the first, second, third and potential fourth materials are different from each other. "Different" as used herein means at least one of (a) a difference of at least 2% in at least one infrared peak, (b) a difference of at least 2% in at least one nuclear magnetic resonance peak, (c) a difference of at least 2% in the number average molecular weight, or (d) a difference of at least 5% in polydispersity. Examples of differences in polymeric materials that can provide the difference between polymeric materials include composition, microstructure, color, and refractive index. The term "same" in terms of polymeric materials means not different.

The polymeric article described herein may be made using techniques found in, for example, co-pending PCT Patent Application No. IB2019/055183.

In some embodiments, the adhesive has a thickness in a range from 0.001 to 0.1 (in some embodiments in a range from, 0.001 to 0.05, 0.001 to 0.025, or even 0.001 to 0.01) mm.

In some embodiments, polymeric materials used to make articles described herein may comprise a colorant (e.g., pigment and/or dye) for functional (e.g., optical effects) and/or aesthetic purposes (e.g., each has different color/shade). Suitable colorants are those known in the art for use in various polymeric materials. Exemplary colors imparted by the colorant include white, black, red, pink, orange, yellow, green, aqua, purple, and blue. In some embodiments, it is desirable level to have a certain degree of opacity for one or more of the polymeric materials. The amount of colorant(s) to be used in specific embodiments can be readily determined by those skilled in the (e.g., to achieve desired color, tone, opacity, transmissivity, etc.). If desired, the polymeric materials may be formulated to have the same or different colors.

Another exemplary use for polymeric articles described herein is as an adhesive article that can be adhesively attached or heat bonded to a substrate, for example a bag.

Figure 4:
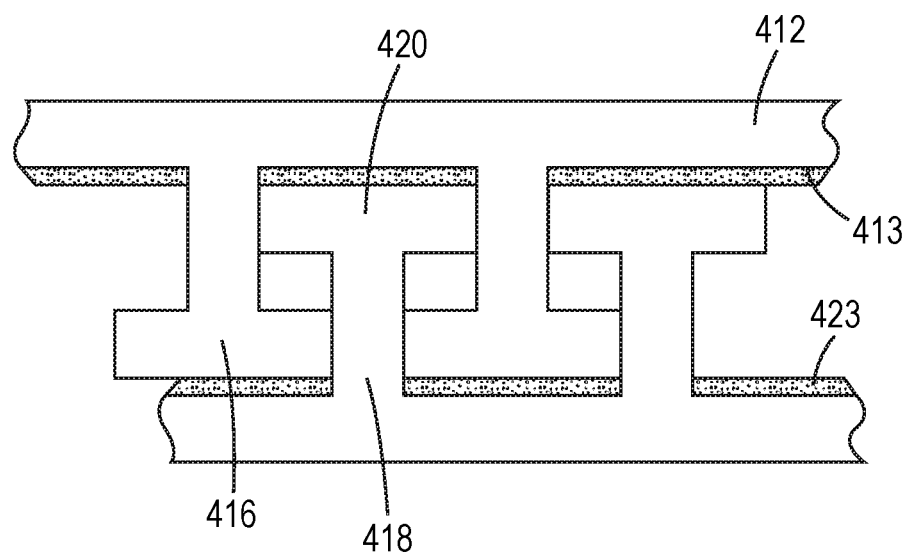
FIG. 4 is a cross sectional of two films of FIG. 2c engaged.

As shown in FIG. 4, polymeric sheets of the present application can be used in articles where at least two polymeric sheets are engaged by facing the top portions and interlocking the top portions into the opposing cavity, allowing for self-mating closure and attachment tape applications. It is noted that the embodiment shown in FIG. 4 is even and uniform, but the interlocking parts may be uneven, and varied across the cross section. The adhesive placement is as described in FIG. 2c herein. The first surface 413 of the base sheet 412, the second surface of the top portion 420 and the surface of the stem 418 are shown. Adhesive 423 is located on the first surface of the base sheet 413.

The performance of self-mating adhesion may be controlled, for example, by the number of rails per centimeter, by the first surface of the base sheet, and the amount of adhesive coverage. Engagement of articles can provide adhesive to adhesive bonding, which may provide significant bond strength. For example, when article as shown in FIG. 2a are self-mated, the adhesive 223a will bond to the adhesive on the opposing rails. In some embodiments, this bond may provide a debonding geometry that is typical of shear mode debonding, when the article is disassembled in traditional peel mode.

Figure 5:
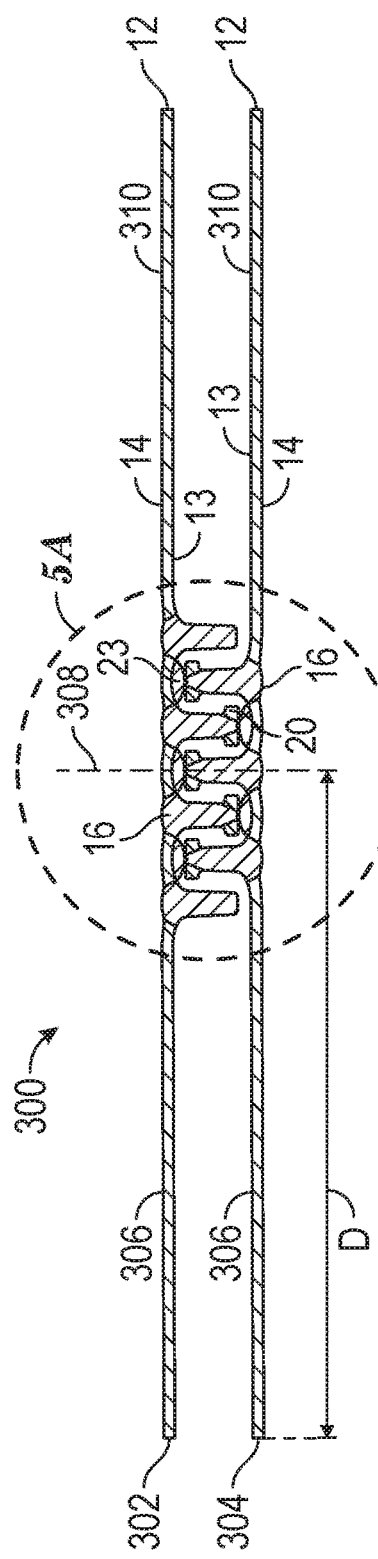
FIG. 5 is another embodiment of polymeric sheets used in a closure system.
Figure 6:
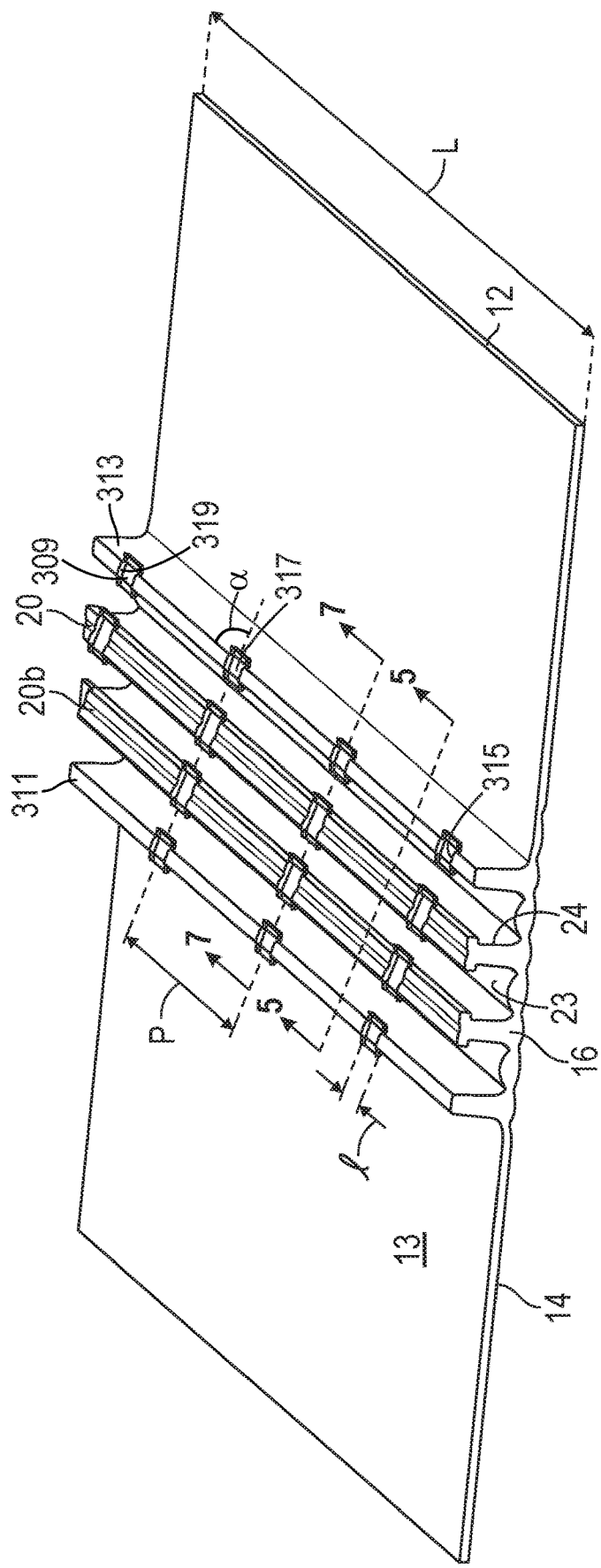
FIG. 6 is a perspective view of the first strip on FIG. 5.
Figure 7:
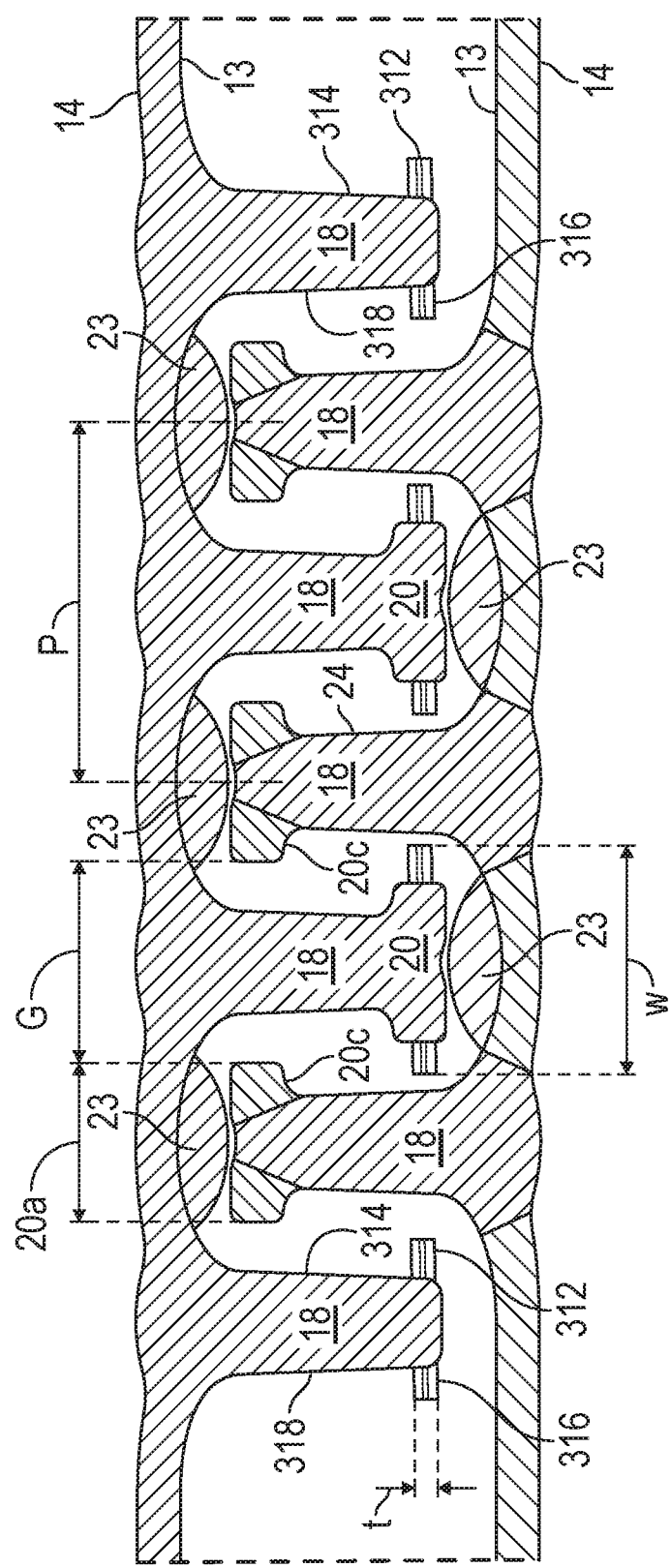
FIG. 7 is a close up of FIG. 5 viewed along 7-7 in FIG. 6.

Referring now to FIGS. 5, 6, and 7 another embodiment of the polymeric sheet 10 is disclosed. Any of the previous description above can be combined and used with this embodiment. Two polymeric sheets are shown in an engaged and interlocked manner forming a closure 300. The closure 300 has a first strip 302 and a second strip 304. Each strip has a base sheet 12 having a first surface 13 and a second surface 14 opposite the first surface. The base sheet has a first flange 306 extending to the left from a centerline 308 and a second flange 310 extending to the right from the centerline 308. The flanges do not contain any fastener hooks. A plurality of fastener hooks is disposed on each base sheet between the flanges. The first and second flanges extend for a significant distance away from the centerline 308 of the closure. The length of each flange can be adjusted and will ordinarily be a length sufficient to ensure adequate bonding to film during pouch converting. A typical flange ranges from 3 to 5 millimeters, but could be greater than 25 mm for complex pouch converting processes. The first and second flanges 306, 310 can be used to attach the closure system to a bag opening for re-closeable sealing the top of a bag.

The first and second strips have a plurality of rails 16 projecting from the first surface 13 of each base sheet 12 with the plurality of rails 16 disposed between the two flanges. The rails comprise at least a stem portion 18 attached to and substantially upright, for example perpendicular, from the first surface 13. Some of the rails may be uncapped rails as discussed later and some of the rails also comprise a top portion 20 on the distal end of the stem opposite the base sheet. The rails have a width 18*a* and the top portion 20 forms a cap having a width 20*a* or a cap width, CW, that is greater than 18*a*. The cap overhangs at least one side of the rails and preferably overhangs both sides of the rail as seen. The rails have a length, L, that is greater than the width 18*a* with the length, L, extending in the machine-direction of the closure during manufacturing. Typically, the length, L, of the closure is sized to extend completely across the opening of a bag the closure is used on.

At least some of the rails can have a substantially continuous top portion or cap extending for the length of the closure, L. As used herein, substantially continuous means greater than 50%, 60%, 70%, 80%, 90%, 95%, or even 100% of the length of the rail, L, has a cap present. To provide more flexibility to the closure, the cap, the rail, or both, may be intermittently cut transversely into smaller segments since the adhesive lanes can still form an airtight seal; especially, if the cuts are staggered along the length of the rail. However, in a preferred embodiment, the cap and rails are continuous and uninterpreted along the length of the closure, L as seen in FIG. 1.

The cap can have various cross-sectional shapes. For example, it can be rectangular, square, oval, or circular, curvilinear, bulbous, or other shape that overhangs the rail on at least one side. Often the first and second strips 302 and 304 are produced by extruding polymeric material(s) from a die. As such, the features tend to be a bit rounded as the hot polymeric material solidifies into the final shape. A preferred cap cross-section is substantially rectangular as seen in FIG. 7 that is slightly rounded from the extrusion process versus the rectangular caps shown in FIGS. 2-4.

In one embodiment seen in FIG. 6, the first strip 302 had four rails with only the center two rails having a top portion 20 forming a cap. A first outermost rail 311 is uncapped and a second outermost rail 313 is also uncapped. In other embodiments all rails, or only some of the rails can have caps. A preferred embodiment is for all interior rails to have caps and the two outermost exterior rails to not have caps.

The exterior uncapped rails function to contain the adhesive within the cavity portion. If the adhesive is not contained, then during the pouch or bag forming the process when the closure is applied to the bag film material, guides that slide in between the flanges of the engaged strip can become gummed up by the adhesive resulting in lost productivity. Additionally, because the second strip 304 does not have adhesive beyond or outside of the rails, there is no opportunity for increased opening force due to cap and adhesive bonding in these areas. Hence a cap on the outer two rails is not strictly necessary. Utilizing rails without caps at the two outer positions also prevents potential increased closure force due to potential interference between the caps on strips 302 and 304. In general, it is preferred to use the minimum number of rails and caps needed to achieve the desired bag security and opening force. Higher numbers of rails may increase the likelihood of cap to cap interference, due to damage or slight manufacturing variations while extruding the strips.

In one embodiment, the second strip 304 had three rails with each rail having a top portion 20 forming a cap. In other embodiments, all rails, or only some of the rails can have caps. In a preferred embodiment, the second strip will have one or more rails fewer than the first strip, such that it resides completely between the two outermost uncapped rails of the first strip when the strips are engaged.

In the illustrated closure, the rail width 18*a* for both strips was approximately 0.29 mm and the cap width, CW (20*a*) was approximately 0.46 mm for each strip. The rails have a pitch, P, between the cross-machine direction centerlines of each rail. The pitch was approximately 1.02 mm. The overall height, H, of the strip from the second surface 14 to the top portion 20 was approximately 0.88 mm. A distance, D, from the centerline 308 to the end of the flange was 7.7 mm for each strip. Finally, the gap, G, between the caps on adjacent rails between the opposing edges of adjacent top portions 20 is equal to P-20*a* and in one embodiment was 0.56 mm.

Thus, in the illustrated embodiment, the gap, G, between the caps on adjacent rails is wider than the cap width, CW (20*a*). Hence, under purely normal force movement and engagement (like a consumer closing the strips), the caps do not engage with each other and slide right past, without any interference or snap unlike a normal hook fastener. It is only under shear loading when the two fastener strips shift laterally in opposite directions that the underside of one cap portion 20*c* (top portion second surface) will be above and potentially engage with the underside 20*c* of an adjacent cap (not illustrated).

Thus, the rails and caps form a first fastener engagement mechanism primarily responsive to shear loading when preventing inadvertent fastener opening. This type of loading can occur in a bag when one of the flanges on the interior/product side of the pouch is left unsealed from the pouch. In this form, when a pouch containing product is dropped, tossed, or shaken, the inadvertent opening of the closure and spillage of the product is prevented by having shear opening forces that can be 2× times, 5× times or even 10× times the force required to open the closure by the consumer—a huge advantage for a closure that is easy to use but especially strong. Increasing the number of rails or increasing the adhesion level will increase the peel/shear force differential (peel force being normal consumer opening and sheer force being unintended transverse sideways opening). In some embodiments, the required shear opening force can be high enough to destroy or damage the closure before unintended shear opening.

Cavities 24 are present between adjacent rails on each strip as previously discussed. Some of the rails 18 may be uncapped, but the sides of the opposing rails, and the first surface 13 of the base sheet still form a cavity extending in the machine-direction for the outermost uncapped rails. An adhesive 23 can be located anywhere in the cavity, but in this embodiment, adhesive is present only on the first surface 13 of the base sheet between each of the rails 18. No adhesive is placed on the top portion first surface 20b of the caps or on top of the uncapped rails in this embodiment; since the adhesive would be exposed, tacky, and cause the closure to stick to things or stop working quickly when the adhesive was contaminated with debris.

In the illustrated embodiment, the first strip has three lanes of adhesive 23 running the full length of the closure in the cavities 24 and the second strip has two lanes of adhesive 23 running the full length of the closure in the cavities. Thus, five full-length adhesive lanes for airtight sealing run the entire length of the closure. The number of full-length adhesive lanes forming seals can be anywhere from 1 to 100, or from 2 to 20, or from 3 to 8. Preferably, a minimum number of rails to provide adequate closure is used to minimize cost and reduce the potential jamming of the rails due to deformation of the strips during use, or due to variations in manufacture.

The adhesive is responsive to normal forces and shear forces when the two strips are engaged. The pressure sensitive adhesive is actually the principle mechanism that holds the two strips together since the gap, G, is wider than the cap width, CW (20a). The adhesive, as previously discussed, forms an airtight closure in combination with the full-length rails and caps that engages with it. The adhesive between each of the rails in the cavities contacts the top portion first surface 20b of each cap and forms a second fastener engagement mechanism responsive to both shear and normal loading when preventing inadvertent fastener opening. The second fastener engagement mechanism comprises adhesion while the first fastener engagement mechanism comprises mechanical interference of one cap trying to slide past a second cap with the underside portions 20c of the caps catching on each other.

Since the gap, G, between the top portions is wider than the width of the top portions, CW (20a), the fastener is super easy to close. In fact, there can be essentially no snap force needed to close it. Only the adhesive lanes need to be brought into contact with the top of the cap portions. However, it can be difficult to know if the closure is correctly closed since there is no audible or tactical snap to close it, unlike a normal hook fastener.

To solve the lack of a noise or tactile cue that the fastener is closed, at least some of the rails and/or caps have a periodic secondary cap member. The periodic secondary cap member, as its name implies, does not extend the full length of the rails, and is interrupted and repeats in either a regular pattern or a random pattern. The periodic secondary cap member can be an interrupted molded extrusion, a bump, a flange, a molded projection, a smooshed portion of the cap, or an embossed depression.

The periodic secondary cap member is typically present when there is at least one primary full-length cap present; although, it could be placed only on the uncapped rails. Thus, the fastener can have at least one substantially continuous cap on at least one rail and at least one periodic secondary cap member on either the at least one uncapped rail or on the at least one substantially continuous cap or on both. In the embodiment in FIG. 7, the periodic secondary cap member is present on each of the two uncapped rails and on each of the two rails with caps.

Both strips or only one of the strips in the closure can have the periodic secondary cap member present. In a preferred embodiment, the periodic secondary cap member was present only on the first strip. The first strip thus provides the tactile sound and feel for closure engagement. The second strip, with its uninterrupted cap shape void of the periodic secondary cap member, in combination with the first strip, provides the air seal when the caps of both strips are embedded into the adhesive lanes on each of the strips. In one embodiment, only the first strip or only second strip had the periodic secondary cap member because of a desire for a low closure force, and thus the total number of periodic secondary caps members was limited to reduce mechanical interference when closing.

In one embodiment, after the first strip has been extruded, solidified and cooled, a heated gear wheel with a helical tooth pattern is brought into rotational contact with the top portion first surface 20b of first strip. The heated gear wheel with a helical gear pattern impresses upon the top of the rails and the caps. The rails and caps when subjected to the heated gear wheel melt in localized areas of the gear's teeth. That action tends to flatten the top portions of the rails or caps, leaving a depression 309, and then pushes the melted strip material out to the sides forming a first projection 312 on a first side 314 of the cap or rail, where the first protrusion is attached, and an opposing second projection 316 on a second side 318 of the cap or rail, where the second protrusion is attached as best seen in FIG. 7, and leaving a localized depression in the top surface of the cap or rail.

The localized depression 309 can have a first angled surface 315 dipping below the height of the cap or rail, connected to one end of a flat surface 317, and a second angled surface 319 connected to the other end of the flat surface that rises back up to the height of the cap of rail. Thus, the localized depression 309 is replicating the profile of the gear tooth that created it. Other profiles or embossing tools can be used to create the localized depression and form the projections that extend from the sides of the cap or rail.

The periodic secondary cap member has a width, w, a thickness, t, a depression length, l, a pattern pitch, P, and a transverse centerline of the depressions 309 on adjacent rails is at an angle α to the longitudinal centerline of the rail or caps. In one embodiment, the width, w, was 700 microns, the thickness, t, was 0.2 mm, the depression length, l, was 2.0 mm, and the pattern pitch, P, was 10 mm and the angle α was 40 degrees. The depression had a depth from the top of the cap of 0.20 mm.

The periodic secondary cap width, w, is controlled with a heated gear wheel by the temperature of the gear wheel and the depth of the depression resulting from the applied normal loading of the gear wheel upon the strip. A larger depth creates a larger periodic secondary cap width. Too much depth prevents engagement of the primary or secondary cap with the mating strip fastener since it can deform the cap or rail too much, causing its width to greatly exceed the gap width, G. In general, a depression depth of 0.1 to 0.2 mm is necessary to create a periodic secondary cap width, w, of 0.7 mm when the cap rail width is 0.4 to 0.5 mm.

The periodic secondary cap member can cover only a small amount of the machine direction length, L, of each rail or cap. In one embodiment, preferably, the periodic secondary cap member's machine direction length, l, covers 20% percent of the machine direction length, L, of the cap or rail it is put on. In other embodiments, the periodic secondary cap member can cover equal to or less than 75%, equal to or less than 50%, equal to or less than 40%, equal to or 30%, equal to or less than 20%, or equal to or less than 10% percent but is equal to or greater than 1% or 5% coverage. Adjustment of the secondary cap length, l, is dependent upon the width of the teeth of the heated gear wheel and the circumferential pitch of those teeth. The selected coverage of the periodic secondary cap member and the width of the periodic secondary cap member is set based on the desired tactile feel and ability to easily close the closure. A variety of periodic secondary cap member lengths, pitches, and width combinations can provide a satisfying tactile feel and audible signal without unduly increasing the closure force.

The length of the periodic secondary cap member can interact with the angle, $\alpha$, of the pitch pattern. An angle, $\alpha$, of 90 degrees results in significant interference between adjacent periodic secondary cap members. This may result in a doubled tactile feel or a very "bumpy" closure to close, somewhat akin to driving your car over a series of sequential speed bumps. A periodic secondary cap member angle, $\alpha$, of 45 degrees can result in minimal interference between adjacent caps if the depression length, l, is minimized and is more like hitting the rumble strips with your car on the sides of the interstate as the periodic secondary cap members sequentially come into engagement. In various embodiments, the angle, $\alpha$, can be equal to or less than 90, 80, 70, 60, 50, 45, 40, 30, 20, or 10 degrees but greater than or equal to 1 degree or greater than or equal to 5 degrees.

Mechanical interference of the periodic secondary cap member is dependent upon the pattern pitch, the pattern angle, the number of rails, and the depression length, l. In some embodiments, it may be desired to increase the periodic secondary cap member coverage above 20% of the machine direction length to increase the holding power of the fastener since they do provide increased peel strength unlike the primary cap members.

The width, w, of the periodic secondary cap member is greater than the gap, G, between the caps as seen in FIG. 7. Hence, the periodic secondary cap member must be pushed past the caps and lock into place below the cap on top portion second surface 20c. As such, the periodic secondary cap member forms a third fastener engagement mechanism from mechanical interference primarily responsive to normal loading and peel to prevent inadvertent fastener opening. More importantly, it forms an audible click to cue a consumer the closure is in fact closed.

Since the periodic secondary cap members are disposed at an angle $\alpha$, and can be thin projections, the force to close is reduced since typically only a few of these projections will need to be flexed and engaged at a time as the closure is "zippered shut" by grasping between one's thumb and index finger. Hence, in various embodiments of the invention, since the cap width, CW (20a), is less than the gap, G, and since the periodic secondary projections are present in an interrupted manner only on a portion of each cap or rail, the average Force to Close the closure according to the test method in the Examples, is less than 32 oz force, less than 24 oz force, less than 12 oz force, less than 8 oz force, less than 6 oz force, less than 4 oz force, less than 3 oz force, less than 2 oz force or may even approach zero. Typically, the average force to close is between 1 and 6 oz force.

The cap/pitch ratio (cap width, CW, divided by pitch spacing P of the rails) is typically in the 0.4 to 0.65 range but could be as low as 0.1 for the scenario where the cap width is approximately the size of the stem (example 100 micron stem with 101 micron cap/1000 micron pitch). The cap/pitch ratio can also be 0.45-0.55, or 0.45-0.5, or 0.46-0.48. Increasing the number of rails decreases the operating window to a lower value in order to prevent too much mechanical interference. Decreasing the number of rails increases the max cap/pitch ratio possible still allowing vertical engagement of the rails. This may increase beyond the ratios cited for a single/double rail system.

The gap, G, between the caps can range from approximately 200 microns and up. The size of the gap can be important for particle exclusion from the rail channels and preventing fouling of the adhesive by contaminants.

The cap width, CW, divided by the gap, G, ratio (Cap/CGap ratio) is typically 0.11-1.15, preferably 0.7-1.15 more preferred 0.8-1.00 most preferred 0.80-0.95. Anytime the Cap/CGap ratio exceeds 1, this indicates the cap is physically larger than the gap between caps of the paired fastener that it is to be engaged to. If Cap/CGap ratio is higher than 1, then an audible and/or tactile closure response will be observed upon initial vertical engagement, however there will not be substantial/repetitive click as one slides their fingers along the closure. If the Cap/CGap ratio is higher than 1, then, as the number of rails increases, the closure becomes more difficult to close and will not close at a finite number of rails. If Cap/Cgap ratio is below 1, then no mechanical interference is observed, and the number of rails can be infinitely increased without substantial increases in engagement force caused by mechanical interference.

The periodic secondary cap width, w, divided by the gap, G, ratio (Emb Width/CGap ratio) can range from the lower limit set by the unembossed sample of zero up to 1.26 at a 30 degree embossing angle, $\alpha$. In order to obtain a repetitive closure cue, the Emb Width/CGap should exceed 1.00, meaning there will be some mechanical interference during engagement. The periodic frequency of the embossing distance, P, the angle $\alpha$ of the embossing, number of rails and Emb Width/CGap will influence the resulting audible and tactile closure cue. Defining a 90-degree embossing angle, $\alpha$, as perpendicular to the rails and being a maximum angle, then as the embossing angle decreases and becomes closer to parallel with the rail direction, the ability of the closure to maintain engagement/disengagement function while tolerating a larger Emb Width/CGap ratio increases. For applications with a desired closure cue, the Emb Width/CGap ratio should be above 1.0; the other parameters listed above will determine the upper limit. The Emb Width/CGap ratio can be 1.0-2.0 or 1.05-1.5 or 1.15-1.35.

The periodic secondary cap width, w, divided by the distance between the opposing sides of the stems in the cavity, (Emb Width/SGap ratio) should not exceed 1. If it does the closure will not engage at the embossing depression for the periodic secondary cap member.

The cap width, CW (20a), divided by the distance between the opposing sides of the stems in the cavity (Cap/SGap) should not exceed 1. If it does exceed 1, then the cap is physically too large to fit between the rails. For example, if one had a pitch of 200 microns, and stem width of 100 microns, and a cap width of 101 microns, the closure would not engage.

While the force to close the closure can be exceedingly small and easily controlled by the geometric selections as stated above, the Shear Force to Open, according to the test methods, can be quite large. With five lanes of adhesive contact and the potential sheer unlocking protection provided by adjacent cap engagement, the Shear Force to Open according to the test methods, can be greater than 25 oz/in, or greater than 50 oz/in, or greater than 100 oz/in, or greater than 150 oz/in, or greater than 250 oz/in but is usually less than 1000 oz/in.

The T-peel Force to Open (FTO) according to the test methods can be tailored by the adhesive layer width and thickness, adhesive chemical and rheological properties. The T-peel Force to Open (FTO) can be greater than 2 oz/in but less than 250 oz/in, greater than 5 oz/in but less than 100 oz/in, greater than 10 oz/in but less than 50 oz/in, greater than 15 oz/in but less than 45 oz/in, greater than 20 oz/in but less than 40 oz/in, greater than 30 oz/in, but less than 30 oz/in, greater 50 oz/in than but less than 80 oz/in. Typically, the T-peel force to open is between 20 oz/in to 50 oz/in.

Figure 5A:
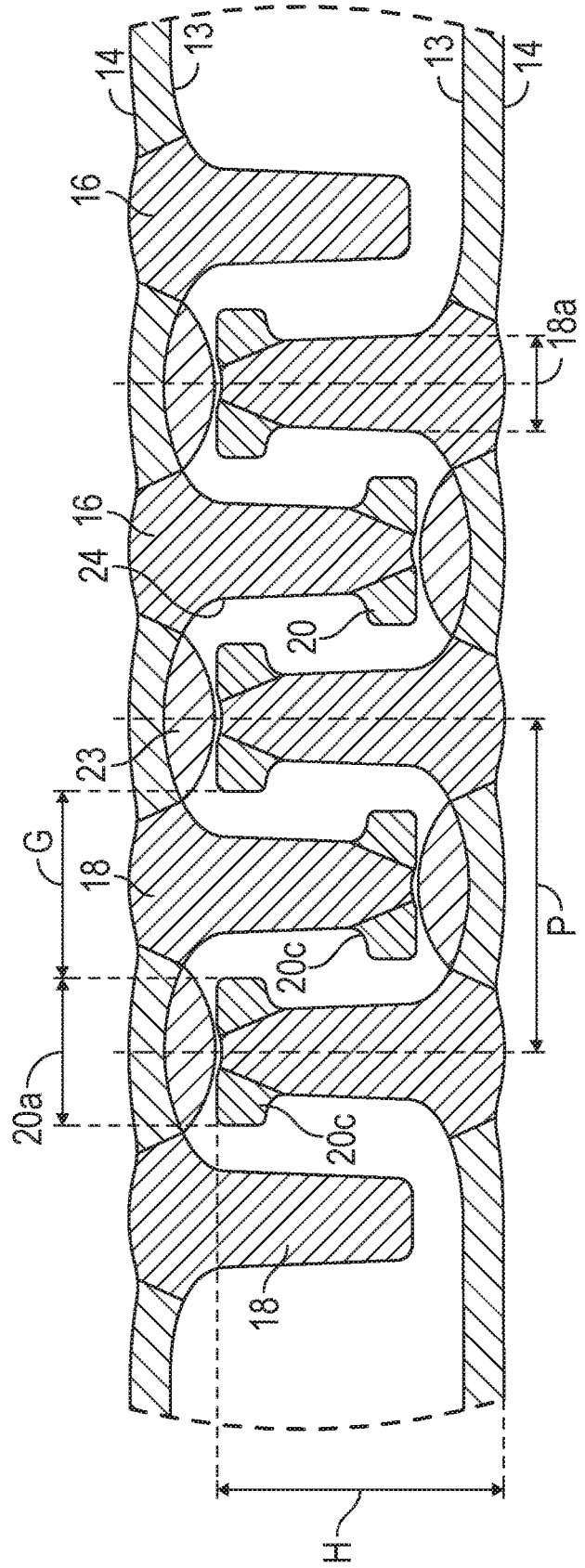
FIG. 5A is a close up of FIG. 5 viewed along line 5-5 in FIG. 6.

In some embodiments, the first and second strips 302 and 304 are made using a shim die and an extrusion process as previously described. In the embodiments shown in FIGS. 5-7, the die extrudes a separate polymeric material for the base sheet 12, a separate polymeric material for the rails 18, a separate polymeric material for the top portion caps 20, and a separate adhesive material for the adhesive lanes 23. These four materials flow together after being extruded and form the various cross-hatched areas shown in FIG. 5A. FIG. 5A is an idealized representation and the die has enough flexibility to have more or less separately extruded mechanical elements. At a minimum, the adhesive material and the material forming the other portions of the structure are co-extruded to form a continuous structure that can vary in material composition across the structure from 2 to 4 different materials. In one embodiment, the stem 18 and the caps 20 are formed from the same extruded material, the adhesive is a separate extruded material, and the base sheet is a third extruded material.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Foreseeable modifications and alterations of this disclosure will be apparent to those skilled in the art without departing from the scope and spirit of this invention. This invention should not be restricted to the embodiments that are set forth in this application for illustrative purposes.

EXAMPLES

Unless otherwise noted, all parts, percentages, ratios, etc. in the examples and the rest of the specification are by weight, and all materials used in the examples were used as obtained from the suppliers.

The following abbreviations may be used: m=meters; cm=centimeters; mm=millimeters; um=micrometers; ft=feet; in=inch; RPM=revolutions per minute; g=grams; kg=kilograms; oz=ounces; ozf=ounces of force; N=Newtons; lb=pounds; lbf=pounds of force; w=weight %; Pa=Pascals; sec=seconds; min=minutes; hr=hours; db=decibels; $cm^3$=centimeters cubed; $in^3$=inches cubed; and RH=relative humidity. The terms "weight %", "% by weight", and "wt %" are used interchangeably.

Materials

Below is a list of materials used in the Examples provided herein.

TABLE 1

Materials

| Trade designation | Description | Supplier |
| --- | --- | --- |
| KRATON D1340 | Polymodal and asymmetric SIS star block copolymer | Kraton Corporation, Belpre, OH, USA |
| ESCOREZ 1310 | Aliphatic hydrocarbon resin, tackifier | ExxonMobil, Houston, TX, USA |
| IRGANOX 1076 | Antioxidant | BASF, Florham Park, NJ, USA |
| ELITE 5230G | Polyethylene resin having a density of 0.916 $g/cm^3$ and melt index (190° C./2.16 kg) of 4 g/10 min. | Dow Chemical Company, Midland, MI, USA |
| ALATHON M6030 | High density polyethylene polymer having a density of 0.960 $g/cm^3$ and melt index (190° C./2.16 kg) of 3 g/10 min. | LyondellBasell, Carrollton, TX, USA |
| PETROTHENE 217000 | Low density polyethylene polymer having a density of 0.923 $g/cm^3$ and melt index (190° C./2.16 kg) of 5.6 g/10 min. | LyondellBasell, Carrollton, TX, USA |
| EFROLEN P85 | High molecular weight poly isobutylene with a number averaged molecular weight (Mn) of 134,000-240,000 g/mol. | ChemSpec Ltd., Uniontown, Ohio, USA |
| OPPANOL B15 | Medium molecular weight poly isobutylene with a viscosity averaged molecular weight (Mv) of 85,000 g/mol. | BASF, Florham Park, NJ, USA |
| OPPANOL N50 | High molecular weight poly isobutylene with a weight averaged molecular weight (Mw) of 565,000 g/mol. | BASF, Florham Park, NJ, USA |
| HOSTAPHAN 2PRKN | 2 mil polyethylene terephthalate film | Mitsubishi Polyester Film, Inc, Greer, SC USA |

Test Methods

For the following test methods, a mechanical tester equipped with a 100 N load cell (INSTRON 5696, available from Illinois Tool Works, Norwood, Mass.) was used.

T-peel Force to Open (FTO) Test

T-peel strength was measured using the procedure generally described in the test method ASTM D-1876, "Standard Test Method for Peel Resistance of Adhesives (T-Peel Test)". Polymeric sheets prepared as described in the Examples below were cut into test samples comprising two strands (strand 1 and strand 2), each strand having a width of about 1 in (2.54 cm) and a total length of about 0.6 in (1.5 cm). Each strand had two flanges, a top flange and a bottom flange. Strand 1 and strand 2 each had a leader consisting of a 3 in (7.6 cm) long piece of filament tape attached to the flange area for mounting purposes. A mechanical fastener was formed when the rails of strand 1 and strand 2 were directionally aligned and engaged. A 11 lb (5 kg) roller was applied over the closures twice in the cross-web direction at a speed of about 12 in/min (30.5 cm/min). Mechanical fastener samples were mounted in the tester by placing the filament tape attached to the top flange of strand 1 within the lower grip of the equipment, and the filament tape attached to the top flange of strand 2, within the upper grip. Using a load cell of 100 N, the specimen was peeled at a crosshead speed of 12 in/min (30.5 cm/min). Peak peel forces and average peel forces were recorded in ozf/in (N/m) and are reported below.

Shear Force to Open Test

Sample preparation and equipment setup used to determine T-peel force, as described above, was used, except that strand 2 had a leader attached to the bottom flange, while strand 1 had the leader attached to its top flange. The sample was then mounted with the leader of strand 1 top flange mounted in the upper grip, and the leader attached to the bottom flange of strand 2, mounted in the lower grip. Peak shear forces and average shear forces were recorded in ozf/in (N/m) and are reported below.

Force to Close (FTC) Test

A custom fixture was mounted to a 10 N load cell of the mechanical tester. The fixture was horizontally disposed approximately 12 in (30 cm) above the lower grip. The 10 N load cell was attached to one side of an adjustable nip comprised of two PTFE (polytetrafluoroethylene) bars, calibrated and zeroed. Polymeric sheets prepared as described in the Examples were cut to sample sizes 7 in (17.8 cm) long and heat sealed two inches from the end of first side and at the very end of the second side, creating about a 5 in (12.7 cm) sample length for testing. The first end of the mechanical fastener sample was clamped in the upper grip and extended through the PTFE nip. Before initiating the test, using the engaged test sample at approximately the midpoint of the 5 in (12.7 cm) test area, the nip opening was adjusted until the load cell registered a force between 0 and 0.35 oz (0.1 N). The two strands comprising the 5 in (12.7 cm) test area were then separated and the upper grip was moved to position the nip in the area of the heat seal of side 1 of the test sample. The test sample was pulled through the nip at a rate of 12 in/min (30.5 cm/min). The average force was reported. Peak and trough forces were determined from the average of 8 peak and troughs respectively. The peak force range was calculated by subtracting the average trough force from the average peak force. The closure cue ratio was calculated by dividing the peak force range by the average peak force.

Closure Contamination Test

Polymeric sheets prepared as described in the Examples below were cut into test samples comprising two strands (strand 1 and strand 2), each strand having a width of about 0.6 in (1.5 cm) and length of about 10 in (25 cm). The strands were disposed on a baking pan with the structured surface facing up and the ends, which were 0.5 in (1.25 cm) wide filaments, taped to baking pan. About 28 g of crumbled contaminant (dog food or potato chips) was sprinkled over each strand and the baking pan gently jostled for 10 seconds to move the contaminant crumbs across surface of the samples. The crumbs were subsequently removed from the pan by turning the pan upside down and gently tapping on its back. Complete FTO, Shear, and FTC tests were completed on the samples.

Closure Cue Sound Measurement

Audible closure cue sound measurements were made using Extech Instruments sound level meter (FLIR Commercial Systems Inc, Nashua, NH). Range was set to "Low" (35-90 db). Response was set to "Max Hold". Function was set to "A". Baseline sound measurements were taken prior to each test. Samples were held 1 inch from the instrument detector and closures were engaged by pressing the polymeric sheet between the thumb and index finger and sliding the polymeric sheet through the pinch point created by the thumb and index finger. The sound measurement was recorded during the sliding action. The peak sound level was recorded. At least three measurements were taken for each sample and then the average was reported.

Air Seal Test

Pouches were prepared using polyester/low linear density polyethylene (LLDPE) (thickness of, respectively, 0.5 mil (12.7 um) and 3.5 mils (89 um)) coextruded films to evaluate the polymeric sheets prepared as described below. Polymeric sheets of about 0.6 in (1.5 cm) wide were cut into strands of length 8 in (20.3 cm). The coextruded film was cut into sheets of about 8 in (20.3 cm) wide and 20 in (50.8 cm) long. The 8 in (20.3 cm) long polymeric sheet was placed on the LLDPE side of the coextruded film running parallel to the 8 in (20.3 cm) long side of the co-extruded film about 1 in (2.54 cm) film edge. A metal spacer wrapped in Teflon tape was inserted between flanges on opposing strands of the polymeric sheet. The film was folded along the center line of the 20 in (50.8 cm) length side to form the second side of the pouch. The polymeric sheet strands were thermally bonded to the coextruded film through three of the four flanges using a heat sealer. The one unsealed flange of the closure was on the inside area of the pouch. The coextruded film was then heat sealed on the remaining two edges to form the pouch. The final pouch dimensions were about 10 in (25.4 cm) long and 8 inches (20.3 cm) wide.

Air displacement was measured using the INSTRON mechanical tester. Two circular plates with diameters of 5.4 in (13.7 cm) replaced the upper and lower grips of the equipment, and a 500 N load cell was used. Pouches were prepared as described above and inflated by manually blowing air into them using a straw. The pouches were sealed by quickly engaging the strands of the polymeric sheets to provide closure. The inflated pouch was placed on the lower plate, and the upper plate was lowered until it contacted the pouch and did not exceed 0.25 lbf applied to the pouch. Compression force was slowly increased by lowering the upper plate at a rate of 1 in/min (2.54 cm/min) until a predetermined force of 4.5 lbf (20 N) was reached. The 4.5 lbf (20 N) was then held constant for 60 sec and the displacement of the upper plate to maintain 4.5 lbf (20 N) was recorded in inches. Volume of air displaced was calculated from the plate diameter and the upper plate displacement, using the assumption that any displacement of the upper plate correlated to the volume of air being pushed through the engaged polymeric sheets. Air displacement rate was calculated by the volume of air displaced from the pouch over 60 sec and is reported below.

EXAMPLES

Preparation of Adhesive

Adhesive Composition A (A) was prepared as follows. A 25 mm twin-screw extruder was used to compound adhesive continuously. The melt from the twin-screw extruder was fed into a positive displacement adhesive pump. The melt from the adhesive pump was fed to the extrusion die. The extruder screws were set up with 3 sections of kneading blocks with conveying elements between kneading sections. The styrene block co-polymer was fed into the extruder at the first zone at a rate of 0.4 lb/hr (0.18 kg/hr). Molten tackifier resin was fed into the extruder between the kneading block sections of the screw at a rate of 0.4 lb/hr (0.18 kg/hr). The antioxidant was pre-blended into the tackifier at a ratio of 2% antioxidant into the tackifier. The extruder RPM was 100 and the extruder temperature was 150° C. Excess compounded adhesive was purged as waste at a rate of 0.33 lb/hr (0.15 kg/hr). Adhesive Composition A (A) was a styrene-based adhesive composition comprised of a styrene-isoprene block copolymer (KRATON 1340), a tackifier (ESCOREZ 1310), and antioxidant (IRGANOX 1076) at a weight ratio of, respectively 1:1:0.01.

Adhesive Composition B (B) was prepared as follows. A 25 mm twin-screw extruder was used to compound adhesive continuously. The twin-screw was fed with two molecular weights of polyisobutylene rubber, these separate feed streams were melted and pumped using separate single-screw extruders at a temperature of 200° C. The high molecular weight rubber was fed at 3.97 lb/hr (1.8 kg/hr) into the first feed port of the twin-screw extruder. The lower molecular weight rubber was fed at the fourth port at a rate of 3.75 lb/hr (1.7 kg/hr). The tackifier was fed into the seventh port at a rate of 3.75 lb/hr (1.7 kg/hr). The melt from the twin-screw extruder was fed into a pail for storage. The extruder RPM was 100 and the extruder temperature was 150° C.

Adhesive Composition B (B) was an isobutylene-based adhesive composition comprising a first polyisobutylene polymer (EFROLEN P85), a second polyisobutylene polymer (OPPANOL B15), a tackifier (ESCOREZ 1310), and antioxidant (IRGANOX 1076) at a ratio of, respectively, 1:0.5:0.5:0.01.

Adhesive Composition C (C) was prepared in a similar manner as Adhesive

Composition B (B). Adhesive Composition C (C) was an isobutylene-based adhesive composition comprising a first polyisobutylene polymer (ERFOLEN P85), a second polyisobutylene polymer (OPPANOL N50), a tackifier (ESCOREZ 1310), and anti-oxidant (IRGANOX 1076) at a ratio of, respectively, 1:0.5:0.5:0.01. This adhesive provides similar performance to Adhesive Composition B (B).

Adhesive Compositions A-C are provided below in Table 2.

TABLE 2

| | Adhesive Compositions A-C | | | | | |
|---|---|---|---|---|---|---|
| Adhesive Composition | Efrolen P85 (g) | Oppanol B15 (g) | Oppanol N50 (g) | Kraton 1340 (g) | Escorez 1310 (g) | Irganox 1076 (g) |
| A | | | | 50 | 49 | 1.0 |
| B | 50 | 25 | | | 24.5 | 0.5 |
| C | | | 75 | | 24.5 | 0.5 |

Preparation of Polymeric Sheets

Figure 3A:
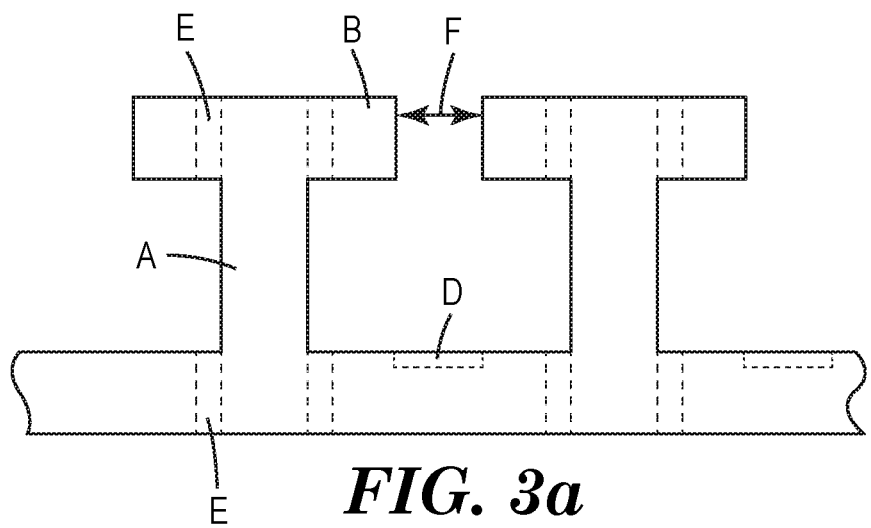
FIG. 3a is a cross-sectional view of extrusion orifices of a co-extrusion die assembled with a multi shim repeating pattern.
Figure 3B:
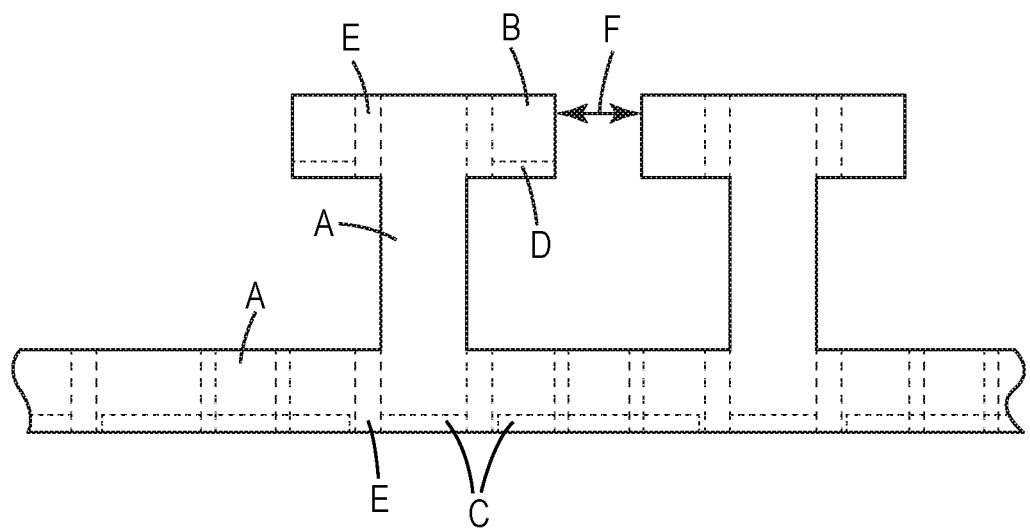
FIG. 3b is a cross-sectional view of extrusion orifices of another co-extrusion die assembled with a multi shim repeating pattern.

Polymeric sheets (mechanical fasteners) comprising a base sheet including: a plurality of rails, including a stem portion and a top portion; and an adhesive layer, were prepared as generally described in co-pending PCT Patent Application No. IB2019/055183, the disclosure of which is incorporated herein by reference in its entirety. A co-extrusion die was assembled with a multi-shim repeating pattern of extrusion orifices, as shown in FIGS. 3a and 3b. A first extrusion cavity was connected to a first plurality of orifices, A, and produced the stem portion of the rail. A second extrusion cavity was connected to a second plurality of orifices, B, and produced the top portion of the rail. A third extrusion cavity was connected to a third plurality of orifices, C, and produced the base sheet of the polymeric sheet. And a fourth extrusion cavity was connected to a fourth plurality of orifices, D, and produced the adhesive layer. Spacer shims, E, were used to separate orifices and passageways within the die and to create weld lines to join flow streams together. The shims were assembled to create two polymeric sheets with a spacer section between sheets.

An exemplary embodiment includes the first polymeric sheet that was comprised of 5 T shaped rails, with sections without rails on each end and the second polymeric sheet was comprised of 4 T shaped rails, also with sections without rails on each end. The shims were assembled to create a die at approximately 3.15 in (8 cm) in width. The inlet fittings on the two end blocks were each connected to conventional extruders. A first single-screw extruder feeding the first cavity was loaded with a polyethylene polymer (obtained under the trade designation ALATHON 6030). A second single-screw extruder feeding the second cavity was loaded with a polyethylene polymer (obtained under the trade designation ALATHON 6030). A third single-screw extruder feeding the third cavity was loaded with a 40/60 parts by weight blend of, respectively, polyethylene (ELITE 5230G) and high-density polyethylene (ALATHON 6030).

Adhesive Composition A, B, or C was pumped into the extrusion die used to make the polymeric sheets utilizing a pail unloader to melt and pump the adhesive from the storage pail. A positive displacement gear pump was used to regulate the flow between the pail unloader and the die.

The melt was extruded vertically into an extrusion quench takeaway. The quench roll was a smooth, temperature-controlled chrome plated 7.9 in (20 cm) diameter steel roll. The quench temperature was controlled with internal water flow. The web path wrapped 180 degrees around the chrome steel roll and then to a windup roll.

Other process conditions are listed in Table 3, below:

TABLE 3

| Process conditions | |
|---|---|
| Flow rate of first polymer (stem portion) | 11.3 kg/hr |
| Flow rate of second polymer (top portion) | 3.7 kg/hr |
| Flow rate of third polymer (base sheet) | 0.2 kg/hr |
| Flow rate of fourth polymer (adhesive layer) | 2.3 kg/hr |
| Extrusion temperature | 191° C. |
| Quench roll temperature | 16° C. |
| Quench takeaway speed | 10 m/min |

An optical microscope was used to measure web dimensions, shown in Table 4 below.

TABLE 4

| Web dimensions | |
|---|---|
| Total Caliper | 0.6 mm |
| Cap Width | 0.35 mm |
| Cross-web repeat: | 0.72 mm |
| Stem Width: | 0.16 mm |
| Base thickness: | 0.09 mm |
| Adhesive Thickness: | 0.06 mm |

Examples 1-15 (EX1-EX15) and Comparative Examples 1-3 (C1-C3)

Polymeric sheets of Examples EX1-EX15 were generally prepared as described in "Preparation of Polymeric Sheets" above, with variations to the shim stack design and/or extruder output to control structural features as shown in Table 5 below. Adhesive placement and relative composition of each polymeric sheet (mechanical fastener) varied. Comparative Examples 1-3 (C1-C3) were prepared as described below. Compositions for Examples 1-15 (EX1-EX15) and Comparative Examples 1-3 (C1-C3) are summarized in Table 6 below.

TABLE 5

Die stacking details of Examples 1-15 (EX1-EX15)

| Examples | Orifice Design | A height (microns) | A width (microns) | B height (microns) | B width (microns) | F Length (microns) |
|---|---|---|---|---|---|---|
| EX1 | FIG. 3a | 1524 | 305 | 381 | 203 | 406 |
| EX2 | FIG. 3a | 1524 | 406 | 381 | 203 | 406 |
| EX3 | FIG. 3b | 1524 | 406 | 381 | 305 | 406 |
| EX4 | FIG. 3a | 2286 | 305 | 381 | 203 | 406 |
| EX5 | FIG. 3a | 1524 | 305 | 381 | 203 | 406 |
| EX6 | FIG. 3a | 2286 | 508 | 381 | 203 | 406 |
| EX7-EX11 | FIG. 3a | 2286 | 508 | 381 | 203 | 406 |
| EX12 | FIG. 3a | 2286 | 508 | 381 | 203 | 406 |
| EX13 | FIG. 3a | 1524 | 203 | 381 | 102 | 203 |
| EX14 | FIG. 3a | 2286 | 508 | 381 | 203 | 406 |
| EX15 | FIG. 3a | 2286 | 508 | 381 | 203 | 406 |

TABLE 6

Compositions of EX1-EX15 and C1-C3

| EX | Top Portion | Stem Portion | Base sheet | Adhesive | Adhesive Placement |
|---|---|---|---|---|---|
| EX1 | ALATHON 6030 | | ALATHON 6030/ELITE 5230G (60/40 w/w) | A | On base sheet between stems |
| EX2 | | | | B | |
| EX3 | | | | B | Underside of top portion |
| EX4 | ALATHON 6030/ELITE 5230G (60/40 w/w) | | | B | On base sheet between stems |
| EX5 | ALATHON 6030 | ALATHON 6030/ELITE 5230G (60/40 w/w) | | A | |
| EX6 | ALATHON 6030 | | PETROTHENE 217000/ELITE 5230G (80/20 w/w) | B | On base sheet between stems |
| EX7 | | | | | |
| EX8 | | | | | |
| EX9 | | | | | |
| EX10 | | | | | |
| EX11 | | | | | |
| EX12 | | ALATHON 6030 | ALATHON 6030/ELITE 5230G (60/40 w/w) | B | On base sheet between stems |
| EX13 | | ALATHON 6030 | ALATHON 6030/ELITE 5230G (80/20 w/w) | B | On base sheet between stems |
| EX14 | | ALATHON 6030 | PETROTHENE 217000/ELITE 5230G (80/20 w/w) | C | On base sheet between stems |

TABLE 6-continued

Compositions of EX1-EX15 and C1-C3

| EX | Top Portion | Stem Portion | Base sheet | Adhesive | Adhesive Placement |
|---|---|---|---|---|---|
| EX15 | ALATHON 6030 | PETROTHENE 217000 | PETROTHENE 217000/ELITE 5230G (80/20 w/w) | C | On base sheet between stems |
| C1 | ALATHON 6030 | | ALATHON 6030/ELITE 5230G (60/40 w/w) | NA | NA |
| C2 | ALATHON 6030 | | ALATHON 6030/ELITE 5230G (60/40 w/w) | NA | NA |
| C3 | NA | | HOSTAPHAN 2PRKN | B | On base sheet |

Structural features including average pitch, cap width, stem width, rail height, base sheet thickness and adhesive thickness were measured and are reported in micrometers (um) in Table 7 below, along with gap widths and ratios, for Examples 1-13 (EX1-13). Embossed structural features are presented in Table 8 below for Examples 6-12 (EX6-EX12).

TABLE 7

Structural Features of Examples EX1-EX13

| Example | Pitch (um) | Cap Width (um) | Cgap Width (um) | Sgap Width (um) | Cap/Pitch Ratio | Cap/Cgap Ratio | Cap/Sgap Ratio | Stem Width (um) | Base (um) | Rail Height (um) | Adhesive Thickness (um) |
|---|---|---|---|---|---|---|---|---|---|---|---|
| EX1 | 710 | 340 | 370 | 560 | 0.48 | 0.92 | 0.61 | 150 | 85 | 600 | 60 |
| EX2 | 755 | 385 | 370 | 545 | 0.51 | 1.04 | 0.71 | 210 | 108 | 535 | 130 |
| EX3 | 760 | 370 | 390 | 580 | 0.49 | 0.95 | 0.64 | 180 | 140 | 600 | 150 |
| EX4 | 890 | 400 | 490 | 680 | 0.45 | 0.82 | 0.59 | 210 | 100 | 1000 | 130 |
| EX5 | 730 | 350 | 380 | 580 | 0.48 | 0.92 | 0.60 | 150 | 140 | 600 | 55 |
| EX6 | 954 | 458 | 496 | 691 | 0.48 | 0.92 | 0.72 | 263 | 108 | 838 | 92 |
| EX7 | 954 | 458 | 496 | 691 | 0.48 | 0.92 | 0.72 | 263 | 108 | 838 | 92 |
| EX8 | 954 | 458 | 496 | 691 | 0.48 | 0.92 | 0.72 | 263 | 108 | 838 | 92 |
| EX9 | 954 | 458 | 496 | 691 | 0.48 | 0.92 | 0.72 | 263 | 108 | 838 | 92 |
| EX10 | 954 | 458 | 496 | 691 | 0.48 | 0.92 | 0.72 | 263 | 108 | 838 | 92 |
| EX11 | 1028 | 470 | 558 | 742 | 0.46 | 0.84 | 0.63 | 286 | 115 | 889 | 80 |
| EX12 | 890 | 460 | 430 | 610 | 0.52 | 1.07 | 0.75 | 280 | 140 | 975 | 250 |
| EX13 | 330 | 150 | 180 | 250 | 0.45 | 0.83 | 0.60 | 80 | 85 | 550 | 80 |

TABLE 8

Embossing Structural Features of Examples 6-12 (EX 6 - EX12)

| Example | Emb Angle (°) | Emb. Width (um) | Emb. Depth (um) | Pitch (um) | Cgap Width (um) | Sgap Width (um) | Emb Width/Pitch Ratio | Emb Width/Cgap Ratio | Emb Width/Sgap Ratio |
|---|---|---|---|---|---|---|---|---|---|
| EX6 | 130 | 496 | 691 | 954 | 496 | 691 | 0.48 | 0.92 | 0.66 |
| EX7 | 130 | 496 | 691 | 954 | 496 | 691 | 0.48 | 0.92 | 0.66 |
| EX8 | 130 | 508 | 61.2 | 954 | 496 | 691 | 0.53 | 1.02 | 0.74 |
| EX9 | 130 | 569 | 76.3 | 954 | 496 | 691 | 0.60 | 1.15 | 0.82 |
| EX10 | 130 | 624 | 96.7 | 954 | 496 | 691 | 0.65 | 1.26 | 0.90 |
| EX11 | 130 | 674 | 197 | 1028 | 558 | 742 | 0.66 | 1.21 | 0.91 |
| EX12 | 90 | 510 | 115 | 890 | 430 | 610 | 0.57 | 1.18 | 0.83 |

Comparative Examples C1 and C2 (C1-C2)

Comparative Examples C1 and C2 were prepared as described in, respectively, Examples EX1 and EX2, above, except that no adhesive layer was present. Structural features of C1 and C2 are shown in Table 9 below.

Comparative Example C3

Comparative Example C3 was prepared by coating Adhesive Composition B onto a polyethylene terephthalate (PET) flat base sheet (no projections). The PET base sheet was 2 mils thick (51 microns), and the adhesive layer was 50 microns thick.

TABLE 9

Structural Features of Comparative Examples 1-3 (C1-C3)

| Example | Pitch (μm) | Cap width (μm) | Cgap Width (μm) | Sgap Width (μm) | Cap/ Pitch Ratio | Cap/ Cgap Ratio | Cap/ Sgap Ratio | Stem Width (μm) | Base (μm) | Rail Height (μm) | Adhesive Thickness (μm) |
|---|---|---|---|---|---|---|---|---|---|---|---|
| Example C1 | 730 | 350 | 380 | 570 | 0.48 | 0.92 | 0.61 | 160 | 80 | 630 | None |
| Example C2 | 720 | 385 | 335 | 510 | 0.53 | 1.15 | 0.75 | 210 | 108 | 535 | None |
| Example C3 | NA | NA | NA | NA | NA | NA | NA | NA | 51 | NA | 50 |

TEST RESULTS

T-peel Force to Open (FTO) (maximum (Peak) force and average (Avg) force); and Shear Force to Open (FTO) (maximum (Peak) force and average (Avg) force); and Force to Close (FTC) (maximum (Peak) force and average (Avg) force) of EX1-EX12 and C1-C2 were tested. Results are reported in Table 10 below, wherein NC denotes "non closure", that is, the polymeric sheets did not provide proper closure.

TABLE 10

T-peel FTO, Shear FTO, and Force to FTC
Test Results of Cl-2, EX1-EX12

| Examples | T-peel FTO Peak Force ozf/in (N/m) | T-peel FTO Avg Force ozf/in (N/m) | Shear FTO Peak Force ozf/in (N/m) | Shear FTO Avg Force ozf/in (N/m) | FTC Peak Force ozf (N) | FTC Avg Force ozf (N) |
|---|---|---|---|---|---|---|
| EX1 | 39.1 (0.28) | 19.7 (0.14) | 199.8 (1.41) | 157.0 (1.H) | 10.3 (2.9) | 4.0 (1.1) |
| EX2 | 39.0 (0.28) | 22.8 (0.16) | 154.8 (1.10) | 108.0 (0.76) | 14.2 (3.9) | 9.1 (2.5) |
| EX3 | 30.9 (0.22) | 14.2 (0.10) | 143.7 (1.02) | 80.6 (0.57) | 7.7 (2.1) | 6.3 (1.8) |
| EX4 | 14.8 (0.10) | 6.3 (0.04) | 141.8 (1.00) | 74.1 (0.52) | 6.3 (1.76) | 4.8 (1.34) |
| EX5 | 16.5 (0.12) | 9.8 (0.07) | 84.5 (0.60) | 69.7 (0.49) | 4.7 (1.32) | 4.1 (1.15) |
| EX6 | 32 (0.23) | 15.7 (0.11) | 114.2 (0.81) | 75.7 (0.53) | 2.4 (0.67) | 1.7 (0.48) |
| EX7 | 28.1 (0.20) | 15.1 (0.11) | 112.1 (0.79) | 71.7 (0.51) | 3.1 (0.87) | 1.7 (0.48) |
| EX8 | 19.3 (0.14) | 11.3 (0.08) | 99.7 (0.70) | 57.0 (0.40) | 3.9 (1.09) | 2.0 (0.56) |
| EX9 | 29.5 (0.21) | 17.3 (0.12) | 110.5 (0.78) | 74.0 (0.52) | 6.4 (1.79) | 2.9 (0.81) |
| EX10 | 30.5 (0.22) | 16.4 (0.12) | 104.2 (0.74) | 65.6 (0.46) | 6.7 (1.88) | 3.0 (0.84) |
| EX11 | 37.0 (0.26) | 19.3 (0.14) | 82.7 (0.58) | 44.9 (0.32) | 6.1 (1.71) | 2.9 (0.81) |
| EX12 | 14.9 (0.10) | 8.9 (0.06) | 88.5 (0.62) | 46.6 (0.33) | 8.0 (2.24) | 4.7 (1.32) |
| C1 | 1.2 (0.01) | 0.16 (0.00) | 148.6 (1.05) | 40.0 (0.28) | 7.0 (1.9) | 5.5 (1.5) |
| C2 | 4.2 (0.03) | 2.6 (0.02) | 167.7 (1.19) | 110.4 (0.78) | NC | NC |

Polymeric sheets of EX1, EX3, EX5, C1, and C3 were subjected to the contamination testing described above. Results are reported in Table 11, below, wherein N/T denotes samples that were "not tested".

TABLE 11

Closure Contamination Test Results for EX1, EX3, EX5, C1, and C3

| Examples | Contaminant | FTO (T-peel adhesion) | | Shear | | FTC | |
|---|---|---|---|---|---|---|---|
| | | Peak Force ozf/in (N/m) | Avg Force ozf/in (N/m) | Peak Force ozf/in (N/m) | Avg Force ozf/in (N/m) | Peak Force ozf (N) | Avg Force ozf (N) |
| EX1 | None | 39.1 (0.28) | 19.7 (0.14) | 199.8 (1.41) | 157.0 (1.11) | 10.3 (2.9) | 4.0 (1.1) |
| | Dog Food | 38.2 (0.27) | 21.0 (0.15) | 181.6 (1.28) | 137.6 (0.97) | 6.6 (1.8) | 4.2 (1.2) |
| EX3 | None | 30.9 (0.22) | 14.2 (0.10) | 143.7 (1.02) | 80.6 (0.57) | 7.7 (2.1) | 6.3 (1.8) |
| | P. Chips | 14.8 (0.10) | 6.3 (0.04) | 141.8 (1.00) | 74.1 (0.52) | 6.3 (1.8) | 4.8 (1.3) |
| EX5 | None | 16.5 (0.12) | 9.8 (0.07) | 84.5 (0.60) | 69.7 (0.49) | 4.7 (1.3) | 4.1 (1.1) |
| | Dog Food | 16.3 (0.12) | 10.1 (0.07) | 80.9 (0.57) | 61.1 (0.43) | 6.0 (1.7) | 2.7 (0.8) |
| C1 | None | 0.6 (0.00) | NT | 74.3 (0.53) | 55.1 (0.39) | 7.0 (1.9) | 5.5 (1.5) |
| | Dog Food | 0.8 (0.01) | NT | 48.3 (0.34) | 26.1 (0.18) | 5.3 (1.5) | 3.7 (1.0) |
| C3 | None | 63.9 (0.45) | 28.4 (0.20) | NT | NT | N/T | N/T |
| | P. Chips | 2.3 (0.02) | 0.8 (0.01) | NT | NT | N/T | N/T |
| | Dog Food | 23.7 (0.17) | 9.4 (0.07) | NT | NT | N/T | N/T |

Polymeric sheets of EX6-EX11 were subjected to the Closure Cue Sound Measurements described in test method above. Results are reported in Table 12 below.

TABLE 12

FTC Test Results and Closure Cue Sound Measurements for EX6-EX11

| EXAMPLES | FTC Ave Force N (ozf) | Ave Peak Force N (ozf) | Average Trough Force N (ozf) | FTC Peak Force Range N (ozf) | FTC Closure Cue Ratio | Audible Click (db)[1] |
|---|---|---|---|---|---|---|
| EX6 | 0.48 (1.7) | 0.67 (2.4) | 0.22 (0.8) | 0.45 (1.6) | 0.28 (1.0) | 66[2] (0)[3] |
| EX7 | 0.48 (1.7) | 0.87 (3.1) | 0.2 (0.7) | 0.67 (2.4) | 0.39 (1.4) | 68[2] (2)[3] |
| EX8 | 0.56 (2.0) | 1.09 (3.9) | 0.25 (0.9) | 0.87 (3.1) | 0.45 (1.6) | 77[2] (11)[3] |
| EX9 | 0.81 (2.9) | 1.79 (6.4) | 0.28 (1.0) | 1.51 (5.4) | 0.53 (1.9) | 862 (20)[3] |
| EX10 | 0.84 (3.0) | 1.88 (6.7) | 0.25 (0.9) | 1.62 (5.8) | 0.56 (2.0) | 89[2] (23)[3] |
| EX11 | 0.81 (2.9) | 1.71 (6-1) | 0.17 (0.6) | 1.54 (5-5) | 0.53 (1.9) | 83[2] (17)[3] |

[1]Background noise level was 66 db.
[2]Values reported as measured.
[3]Values reported after subtraction of background noise level.

Figure 8:
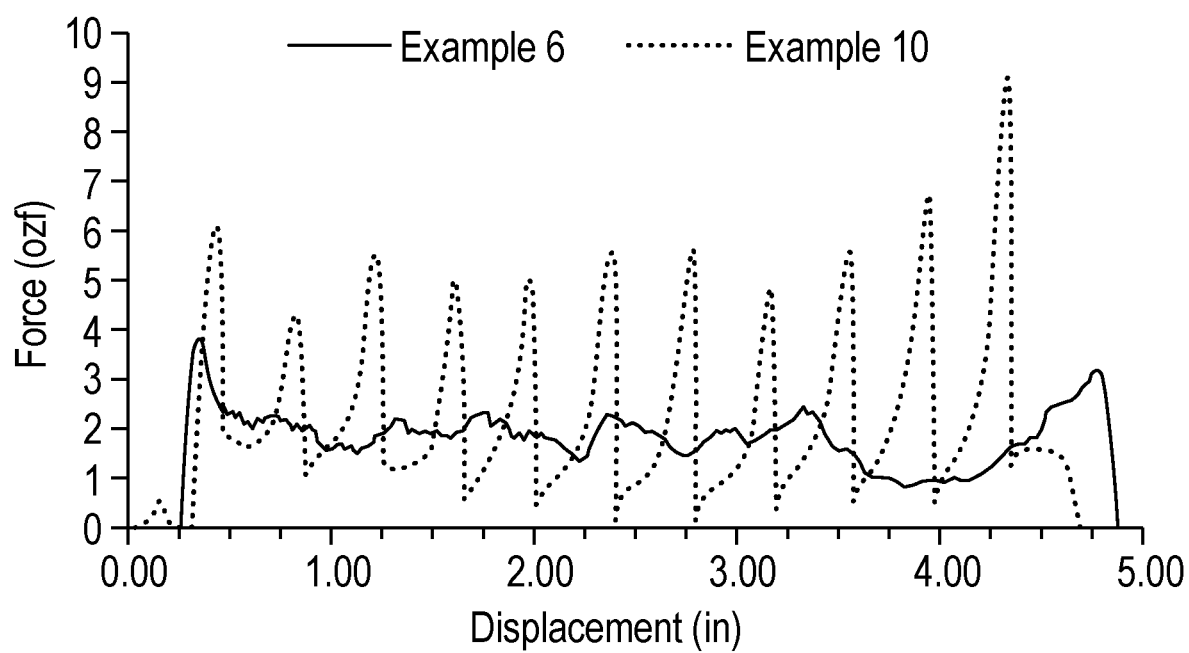
FIG. 8 is a Force to Close comparison graph.

FIG. 8 exemplifies the different Force to Close (FTC) for non-embossed, Example 6 (EX6) and embossed, Example 10 (EX10) samples. The oscillating force observed for EX10 is caused by the mechanical interference created by the periodic secondary cap member from the gear wheel used to emboss the rails. As the user closes the mechanical fastener by pinching between their index finger and thumb and sliding along the closure, an increase in force is felt as each embossing mark is approached, followed by a drop in force and audible click as each embossing mark is passed. The non-embossed sample, EX6, has a relatively stable closing force, does not have has this oscillating behavior, and as a result, does not have any substantial tactile or audible cue that informs the user that the closure has been successfully engaged.

Polymeric sheets of EX1, EX2, EX4, EX5, and C1-C2 were subjected to the Air Seal Test described above. Results are reported in Table 13 below.

TABLE 13

Air Seal Test Results

| Examples | Average of Air Displacement Rate (in$^3$/min) [cm$^3$/min] |
|---|---|
| EX1 | 0.108 [1.77] |
| EX2 | 0.015 [0.25] |
| EX4 | 0.029 [0.47] |
| EX5 | 0.047 [077] |
| C1 | 0.626 [10.26] |
| C2 | 0.188 [3.08] |

Overall, Comparative Examples C1-C2 demonstrate that continuous structured polymeric sheets with no adhesive, do not provide effective sealing performance, as evidenced by their low T-peel FTO Test values, unsatisfactory results from the Closure Contamination Test, as well as by air displacement results from Air Seal Test.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure.

What is claimed is:

1. A polymeric sheet comprising:
   a base sheet having a first surface and a second surface opposite the first surface, and
   a multiplicity of spaced rails projecting from the first surface of the base sheet;
   wherein the rails comprise a stem portion attached to and substantially upright from the first surface of the base sheet and a top portion on the distal end of the stem portion opposite the base sheet, the top portion comprising a first surface opposite the base sheet and a second surface facing the first surface of the base sheet and the rails having a length greater than the width of the stem portions,
   wherein the first surface of the base sheet, the second surface of the top portion and the surface of the stem portion defines a cavity with walls; and
   an adhesive coated on at least a portion of the cavity walls, wherein the first surface of the top portion is adhesive free.

2. The polymeric sheet of claim 1, wherein the base sheet is flexible.

3. The polymeric sheet of claim 1, wherein the adhesive is on the second surface of the top portion, and wherein the second surface of the top portion is parallel to the first surface of the base sheet.

4. The polymeric sheet of claim 1, wherein the rails are continuous along the length of the polymeric sheet and the cross-sectional profile formed by the rails is substantially uniform over the rails.

5. The polymeric sheet of claim 1, wherein rails have a length, and the distance between any two adjacent rails is substantially uniform over the length.

6. The polymeric sheet of claim 1, wherein the base sheet comprises a flange on either side of the multiplicity of rails.

7. A polymeric sheet article comprising:
   a first strip having a plurality of rails projecting from a first surface;
   at least two adjacent rails of the plurality of rails having a top portion forming a cap that overhangs both sides of the rail overhangs at least one side of the rail, the caps each having a cap width, (CW);
   a gap located between the caps on the adjacent rails, wherein a gap width, (G), is wider than the cap width, (CW);
   a cavity located between the two adjacent rails with an adhesive located in the cavity; and
   a periodic secondary cap member located on at least one the plurality of rails, wherein the periodic secondary cap member comprises a localized depression on a top surface of the cap or on a top surface of the rail.

8. The polymeric sheet of claim 7, wherein the periodic secondary cap member comprises a first projection on a first side of the cap and a second projection on a second side of the cap.

9. The polymeric sheet of claim 7, wherein the periodic secondary cap member comprises a first projection on a first side of the rail and a second projection on a second side of the rail.

10. The polymeric sheet of claim 7, wherein a transverse centerline of the localized depressions on the plurality of rails is at angle ($\alpha$) to a machine direction longitudinal centerline of the rail and the angle ($\alpha$) is from 5 degrees to 50 degrees.

11. The polymeric sheet of claim 7, wherein the localized depression comprises a first angled surface, a flat surface, and a second angled surface.

12. The polymeric sheet of claim 7, wherein the periodic secondary cap member has a machine direction length, (l), and the plurality of rails have a machine direction rail length, (L), and the periodic secondary cap member's length, (l), covers less than 75% of the machine direction rail length (L).

13. The polymeric sheet of claim 7, wherein the periodic secondary cap member has a width, (w), and (w) is greater than the gap width, (G).

14. A polymeric sheet comprising:
    a first strip having a plurality of rails projecting from a first surface of a base sheet;
    at least two adjacent rails of the plurality of rails having a top portion forming a cap that overhangs both sides of the rail, the caps each having a cap width, (CW);
    a gap located between the caps on the adjacent rails, wherein a gap width, (G), is wider than the cap width, (CW);
    a cavity located between the two adjacent rails with an adhesive located in the cavity; and
    a periodic secondary cap member located on at least one the plurality of rails, wherein the plurality of rails comprises a first outer rail that is un-capped, a second outer rail that is un-capped, and middle rails with caps.

15. The polymeric sheet of claim 7, wherein a ratio of the cap width, (CW), divided by a pitch spacing, (P), of the plurality of rails is from 0.4 to 0.65.

16. The polymeric sheet of claim 7, wherein a ratio of the cap width, (CW), divided by the gap width, (G), is from 0.8 to 1.0.

17. The polymeric sheet of claim 7, wherein a ratio of the periodic secondary cap member width, (w), divided by the gap width, (G), is from 1.05 to 1.5.

18. A closure comprising the polymeric sheet of claim 7 engageable with a second strip, the second strip comprising:
    a rail projecting from a first surface of a base sheet;
    a top portion located on the rail forming a cap that overhangs at least one side of the rail;
    the cap having a cap width, (CW), that is less than the gap width, (G), wherein a top surface of the cap is engageable with the adhesive in the cavity of the first strip.

19. The closure of claim 18, wherein the first strip comprises a first outer rail that is un-capped, a second outer rail that is un-capped, two middle rails with caps, and three lanes of adhesive located between the first outer rail and the second outer rail in the cavities.

20. The polymeric sheet of claim 14, wherein the periodic secondary cap member has a width, (w), and (w) is greater than the gap width, (G).

* * * * *